(12) United States Patent
Miwa et al.

(10) Patent No.: US 11,143,849 B2
(45) Date of Patent: Oct. 12, 2021

(54) OPTICAL SYSTEM, OPTICAL APPARATUS AND METHOD FOR MANUFACTURING THE OPTICAL SYSTEM

(71) Applicant: Nikon Corporation, Tokyo (JP)

(72) Inventors: Satoshi Miwa, Yokohama (JP); Hiroshi Yabumoto, Yokohama (JP)

(73) Assignee: NIKON CORPORATION, Tokyo (JP)

(*) Notice: Subject to any disclaimer, the term of this patent is extended or adjusted under 35 U.S.C. 154(b) by 179 days.

(21) Appl. No.: 16/321,011

(22) PCT Filed: Jul. 27, 2017

(86) PCT No.: PCT/JP2017/027192
§ 371 (c)(1),
(2) Date: Jan. 25, 2019

(87) PCT Pub. No.: WO2018/021459
PCT Pub. Date: Feb. 1, 2018

(65) Prior Publication Data
US 2021/0055530 A1 Feb. 25, 2021

(30) Foreign Application Priority Data

Jul. 27, 2016 (JP) .............................. JP2016-147248

(51) Int. Cl.
*G02B 15/14* (2006.01)
*G02B 27/42* (2006.01)

(52) U.S. Cl.
CPC . *G02B 15/143101* (2019.08); *G02B 27/4205* (2013.01)

(58) Field of Classification Search
CPC combination set(s) only.
See application file for complete search history.

(56) References Cited

U.S. PATENT DOCUMENTS

2007/0091467 A1* 4/2007 Yasui ................. G02B 27/4211
359/754
2011/0134530 A1* 6/2011 Koga ............. G02B 15/144113
359/558

(Continued)

FOREIGN PATENT DOCUMENTS

CN 1967308 A 5/2007
JP 2004-117828 A 4/2004

(Continued)

OTHER PUBLICATIONS

Office Action dated Jun. 17, 2020, in Japanese Patent Application No. 2016-147248.

(Continued)

*Primary Examiner* — William R Alexander
*Assistant Examiner* — Sharrief I Broome
(74) *Attorney, Agent, or Firm* — SGPatents PLLC

(57) ABSTRACT

An optical system (OL) used for an optical apparatus such as a camera (1) includes a focusing group (Gf) that moves upon focusing, a diffractive optical element (GD) disposed on an object side of the focusing group (Gf) and a negative lens element (L1n) disposed on the object side of the diffractive optical element (GD). The optical system (OL) satisfies the following expressions 0.030<f/fpf<0.050 nd1n+0.006×vd1n<1.910

35<vd1n where,
f: focal length of whole system in infinity focusing state
fpf: focal length of diffractive optical element (GD)
nd1n: refractive index of medium of negative lens element (L1n) on d-line (Continued)

vd1$n$: Abbe number of medium of negative lens element (L1$n$) on d-line.

20 Claims, 13 Drawing Sheets

(56) References Cited

U.S. PATENT DOCUMENTS

| 2013/0021513 A1* | 1/2013 | Eguchi | G02B 9/12 348/335 |
|---|---|---|---|
| 2015/0002939 A1 | 1/2015 | Yasui | |

FOREIGN PATENT DOCUMENTS

| JP | 2007-121440 A | 5/2007 |
|---|---|---|
| JP | 2015-011171 A | 1/2015 |
| JP | 2015-172710 A | 10/2015 |

OTHER PUBLICATIONS

Office Action dated Aug. 3, 2020, in Chinese Patent Application No. 201780046006.4.
English Translation of International Search Report from International Patent Application No. PCT/JP2017/027192, Oct. 31, 2017.
International Preliminary Report on Patentability from International Patent Application No. PCT/JP2017/027192, Feb. 7, 2019.
Office Action dated Jun. 23, 2021, in Chinese Patent Application No. 201780046006.4.

* cited by examiner

OPTICAL SYSTEM, OPTICAL APPARATUS AND METHOD FOR MANUFACTURING THE OPTICAL SYSTEM

TECHNICAL FIELD

The present invention relates to an optical system, an optical apparatus and a method for manufacturing the optical system.

TECHNICAL BACKGROUND

Conventionally, there are proposals for optical systems which are downsized using diffractive optical elements (e.g., see Patent Literature 1). However, the optical system described in Patent Literature 1 is required to further improve optical performance.

PRIOR ARTS LIST

Patent Document

Patent Literature 1: Japanese Laid-Open Patent Publication No. 2015-011171

SUMMARY OF THE INVENTION

An optical system according to a first aspect of the present invention includes a focusing group that moves upon focusing, a diffractive optical element disposed on an object side of the focusing group and a negative lens element disposed on the object side of the diffractive optical element, in which the elements are disposed so as to satisfy the following expressions (1-1), (1-2) and (1-3):

$$0.030 < f/fpf < 0.050 \tag{1-1}$$

$$nd1n + 0.006 \times vd1n < 1.910 \tag{1-2}$$

$$35 < vd1n \tag{1-3}$$

where,
 f: focal length of whole system in infinity focusing state
 fpf: focal length of diffractive optical element
 nd1n: refractive index of medium of negative lens element on d-line
 vd1n: Abbe number of medium of negative lens element on d-line
 The lens element refers to each lens constituting a single lens or cemented lens.

An optical system according to a second aspect of the present invention includes a focusing group that moves upon focusing and has at least two lens elements, a diffractive optical element disposed on an object side of the focusing group, a vibration-isolating group disposed on an image side of the focusing group and configured to move so as to have a displacement component in a direction orthogonal to an optical axis and at least three negative lens elements disposed on the image side of the vibration-isolating group. At least two of the three negative lens elements are specific negative lens elements that satisfy the following expressions (2-1) and (2-2):

$$0.654 < \theta gF3n + 0.00168 \times vd3n \tag{2-1}$$

$$1.98 < nd3n + 0.01 \times vd3n \tag{2-2}$$

where,
 θgF3n: partial dispersion ratio of medium of specific negative lens element
 vd3n: Abbe number of medium of specific negative lens element on d-line
 nd3n: refractive index of medium of specific negative lens element on d-line
 This optical system further satisfies the following expression (2-3).

$$TL/f < 0.61 \tag{2-3}$$

where,
 TL: total length in infinity focusing state
 f: focal length of whole system in infinity focusing state
 The lens element refers to each lens constituting a single lens or cemented lens.

A method for manufacturing the optical system according to the first aspect of the present invention is a method for manufacturing the optical system including a focusing group that moves upon focusing, a diffractive optical element disposed on an object side of the focusing group and a negative lens element disposed on the object side of the diffractive optical element, in which the elements are disposed so as to satisfy the following expressions (1-1), (1-2) and (1-3):

$$0.030 < f/fpf < 0.050 \tag{1-1}$$

$$nd1n + 0.006 \times vd1n < 1.910 \tag{1-2}$$

$$35 < vd1n \tag{1-3}$$

where,
 f: focal length of whole system in infinity focusing state
 fpf: focal length of diffractive optical element
 nd1n: refractive index of medium of negative lens element on d-line
 vd1n: Abbe number of medium of negative lens element on d-line
 The lens element refers to each lens constituting a single lens or cemented lens.

A method for manufacturing the optical system according to the second aspect of the present invention is a method for manufacturing the optical system including a focusing group that moves upon focusing and has at least two lens elements, a diffractive optical element disposed on an object side of the focusing group, a vibration-isolating group disposed on an image side of the focusing group and configured to move so as to have a displacement component in a direction orthogonal to an optical axis and at least three negative lens elements disposed on the image side of the vibration-isolating group, in which at least two of the three negative lens elements are specific negative lens elements that satisfy the following expressions (2-1) and (2-2):

$$0.654 < \theta gF3n + 0.00168 \times vd3n \tag{2-1}$$

$$1.98 < nd3n + 0.01 \times vd3n \tag{2-2}$$

where,
 θgF3n: partial dispersion ratio of medium of specific negative lens element
 vd3n: Abbe number of medium of specific negative lens element on d-line
 nd3n: refractive index of medium of specific negative lens element on d-line
 According to the method for manufacturing the optical system, the respective groups and elements are disposed so as to further satisfy the following expression (2-3).

$$TL/f < 0.61 \tag{2-3}$$

where,
 TL: total length in infinity focusing state f: focal length of whole system in infinity focusing state The lens element refers to each lens constituting a single lens or cemented lens.

DESCRIPTION OF THE EMBODIMENTS

Hereinafter, preferable embodiments will be described with reference to the accompanying drawings.

First Embodiment

Figure 1:
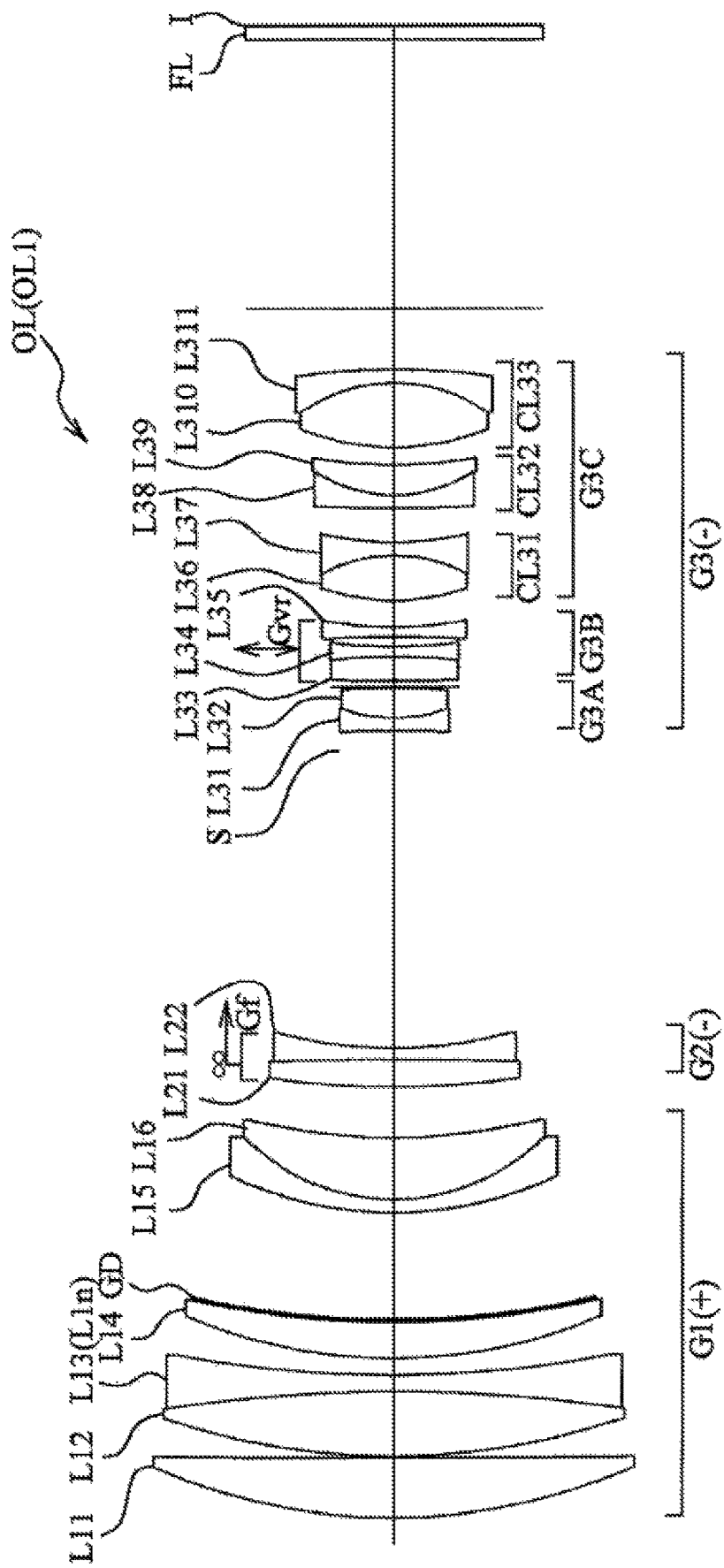
FIG. 1 is a cross-sectional view illustrating a lens configuration of an optical system according to Example 1 in an infinity focusing state.

First, a first embodiment will be described. As shown in FIG. 1, an optical system OL according to the first embodiment is configured to include a focusing group Gf that moves upon focusing, a diffractive optical element GD disposed on an object side of the focusing group Gf and a negative lens element L1n disposed on the object side of the diffractive optical element GD (e.g., biconcave negative lens L13). This configuration makes it possible to simultaneously correct a curvature of field aberration upon short distance focusing and axial chromatic/lateral chromatic aberration in an infinity focusing state. The lens element refers to each lens constituting a single lens or cemented lens.

The optical system OL according to the first embodiment preferably satisfies a conditional expression (1-1) shown below.

$$0.030 < f/fpf < 0.050 \tag{1-1}$$

where, f: focal length of whole system in infinity focusing state fpf: focal length of diffractive optical element GD The conditional expression (1-1) defines a ratio of a focal length of the diffractive optical element GD as a single unit to a focal length of the whole system. This makes it possible to successfully correct axial and lateral chromatic aberrations. Falling below a lower limit value of the conditional expression (1-1) causes correction of axial chromatic aberration to become insufficient, which is therefore not preferable. The lower limit value of the conditional expression (1-1) is preferably set to 0.033 or more preferably to 0.035 to ensure the effects of the conditional expression (1-1). Exceeding an upper limit value of the conditional expression (1-1) causes correction of axial chromatic aberration to become excessive, which is therefore not preferable. The upper limit value of the conditional expression (1-1) is preferably set to 0.047 or more preferably to 0.044 to ensure the effects of the conditional expression (1-1).

The optical system OL according to the first embodiment preferably satisfies a conditional expression (1-2) and a conditional expression (1-3) shown below.

$$nd1n + 0.006 \times vd1n < 1.910 \tag{1-2}$$

$$35 < vd1n \tag{1-3}$$

where, nd1n: refractive index of medium of negative lens element L1n on d-line vd1n: Abbe number of medium of negative lens element L1n on d-line where, the medium is glass, resin or the like, and glass is preferable. The same will apply hereinafter.

The conditional expression (1-2) and the conditional expression (1-3) define a range of a refractive index and dispersion of the medium of the negative lens element L1n. This makes it possible to successfully correct axial and lateral chromatic aberrations while reducing the weight of the optical system OL. Exceeding the upper limit value of the conditional expression (1-2) causes specific gravity of the medium to become heavier, and using a moderate radius of curvature to achieve weight reduction causes Petzval's sum to become negative, causing it to be difficult to correct the curvature of field, which is therefore not preferable. The upper limit value of the conditional expression (1-2) is preferably set to 1.900 or more preferably to 1.890 to ensure the effects of the conditional expression (1-2). Exceeding the upper limit value of the conditional expression (1-3) causes correction of axial and lateral chromatic aberrations to become insufficient, which is therefore not preferable. The upper limit value of the conditional expression (1-3) is preferably set to 38 or more preferably to 41 to ensure the effects of the conditional expression (1-3).

The optical system OL according to the first embodiment preferably satisfies a conditional expression (1-4) shown below.

$$TL/f < 0.61 \tag{1-4}$$

where,

TL: total length in infinity focusing state f: focal length of whole system in infinity focusing state The conditional expression (1-4) defines a ratio of a total length to a focal length of the whole optical system OL in an infinity focusing state. This makes it possible to successfully correct axial and lateral chromatic aberrations while reducing the size of the optical system OL. Exceeding an upper limit value of the conditional expression (1-4) causes the size of the optical system OL to increase, and if measures such as reducing the number of lenses on the object side of the focusing group Gf to be compatible with a weight reduction are taken, correction of lateral chromatic aberration becomes insufficient, which is therefore not preferable. In the case of a configuration in which a vibration-isolating group Gvr for correcting image blur caused by image shake by movement so as to have a displacement component in a direction orthogonal to an optical axis is provided on the image side of the focusing group Gf, even when the weight is reduced by reducing the number of lenses on the image side of the vibration-isolating group Gvr, correction of lateral chromatic aberration becomes insufficient, which is therefore not preferable. The upper limit value of the conditional expression (1-4) is preferably set to 0.60 or more preferably to 0.59 to ensure the effects of conditional expression (1-4). The lower limit value of the conditional expression (1-4) is preferably set to 0.55 or more preferably to 0.56 to ensure the effects of the conditional expression (1-4).

In the optical system OL according to the first embodiment, all lens elements on the object side of the negative lens element L1n are preferably positive lens elements. This makes it possible to successfully correct axial and lateral chromatic aberrations while reducing the weight of the optical system OL.

The optical system OL according to the first embodiment preferably satisfies a conditional expression (1-5) shown below.

$$\theta gF1n+0.00168\times vd1n<0.643 \quad (1\text{-}5)$$

where,

θgF1n: partial dispersion ratio of medium of negative lens element L1n vd1n: Abbe number of medium of negative lens element L1n on d-line Here, when refractive indices corresponding to a g-line, d-line, F-line and C-line are assumed to be ng, nd, nF and nC, respectively, the Abbe number vd on the d-line is defined by the following expression (a) and the partial dispersion ratio θgF is defined by the following expression (b).

$$vd=(nd-1)/(nF-nC) \quad (a)$$

$$\theta gF=(ng-nF)/(nF-nC) \quad (b)$$

The conditional expression (1-5) defines a partial dispersion ratio and a dispersion of the medium used for the negative lens element L1n. This allows axial and lateral chromatic aberrations to be successfully corrected. Exceeding the upper limit value of the conditional expression (1-5) particularly causes correction of lateral chromatic aberration to become insufficient, which is therefore not preferable. The upper limit value of the conditional expression (1-5) is preferably set to 0.642 or more preferably to 0.640 to ensure the effects of the conditional expression (1-5).

The optical system OL according to the first embodiment is preferably configured to include a first lens group G1 having positive refractive power, a second lens group G2 having negative refractive power and having a function as a focusing group Gf that performs focusing by moving in an optical axis direction and a third lens group G3, which are disposed in order from an object. Upon auto focusing using an actuator, this makes it possible to achieve speedy drive and successfully correct spherical aberration and curvature of field upon short distance focusing.

In the optical system OL according to the first embodiment, the first lens group G1 preferably includes two positive lens elements (e.g., the positive meniscus lens L11 and the biconvex positive lens L12 in FIG. 1) and the aforementioned negative lens element L1n on the object side of the diffractive optical element GD. This makes it possible to reduce stray light incident on the diffractive optical element GD and successfully correct lateral chromatic aberration in particular.

In the optical system OL according to the first embodiment, the first lens group G1 preferably includes one positive lens element and one negative lens element on the image side of the diffractive optical element GD (e.g., the negative meniscus lens L15 and the positive meniscus lens L16 in FIG. 1). This makes it possible to reduce the amount of stray light incident on the diffractive optical element GD and successfully correct lateral chromatic aberration in particular.

The optical system OL according to the first embodiment preferably satisfies a conditional expression (1-6) shown below:

$$0.200<f1/f<0.500 \quad (1\text{-}6)$$

where, f1: focal length of first lens group G1 f: focal length of whole system

The conditional expression (1-6) expresses a ratio of a focal length of the first lens group G1 to a focal length of the whole system. It is thereby possible to reduce the size of the optical system OL and successfully correct axial and lateral chromatic aberrations. Falling below a lower limit value of the conditional expression (1-6) makes it difficult to correct lateral chromatic aberration, which is therefore not preferable. The lower limit value of the conditional expression (1-6) is preferably set to 0.250 or more preferably to 0.300 to ensure the effects of the conditional expression (1-6). Exceeding an upper limit value of the conditional expression (1-6) increases the size and weight of the optical system OL, and if, for example, the number of lenses of the first lens group G1 is reduced for size reduction, it becomes difficult to correct spherical aberration, which is therefore not preferable. The upper limit value of the conditional expression (1-6) is preferably set to 0.400 or more preferably to 0.350 to ensure the effects of the conditional expression (1-6).

The optical system OL according to the first embodiment preferably satisfies a conditional expression (1-7) shown below.

$$0.001<f1/fpf<0.030 \quad (1\text{-}7)$$

where, f1: focal length of first lens group G1 fpf: focal length of diffractive optical element GD

The conditional expression (1-7) expresses a ratio of a focal length of the diffractive optical element GD to a focal length of the first lens group G1. It is thereby possible to successfully correct axial and lateral chromatic aberrations. Falling below a lower limit value of the conditional expression (1-7) causes correction of axial chromatic aberration to become insufficient, which is therefore not preferable. The lower limit value of the conditional expression (1-7) is preferably set to 0.008 or more preferably to 0.010 to ensure the effects of the conditional expression (1-7). Exceeding an upper limit value of the conditional expression (1-7) causes correction of axial chromatic aberration to become excessive, which is therefore not preferable. The upper limit value of the conditional expression (1-7) is preferably set to 0.020 or more preferably to 0.015 to ensure the effects of the conditional expression (1-7).

Figure 12:
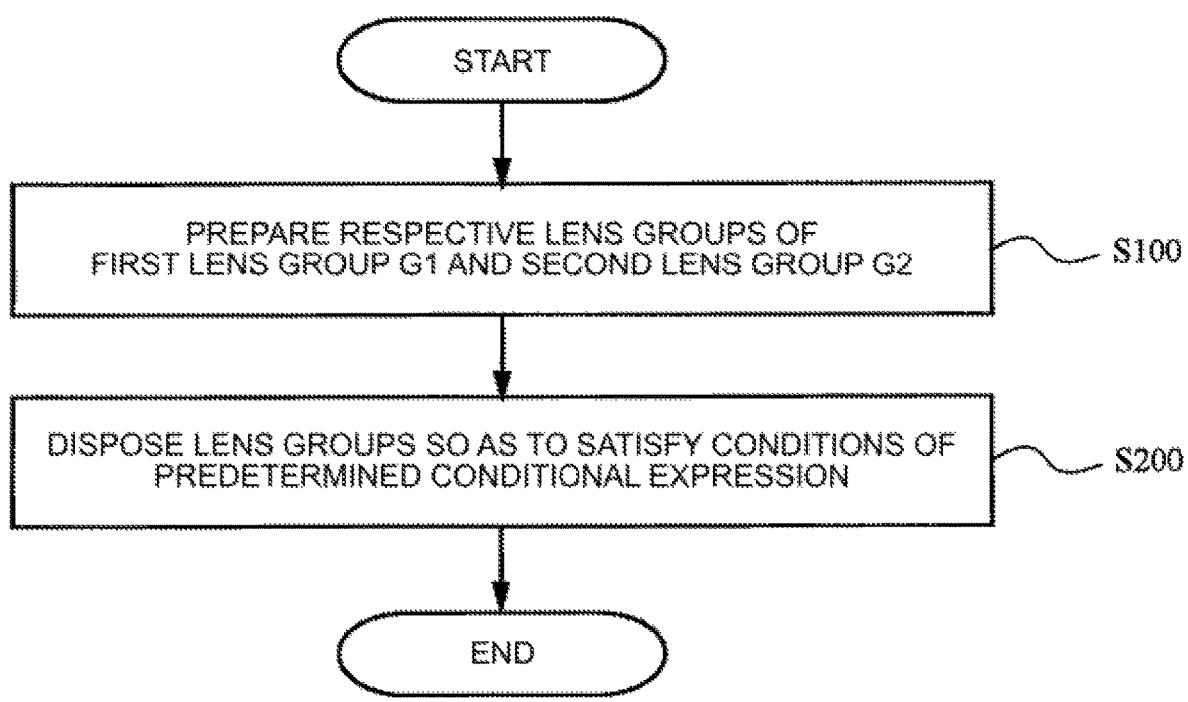
FIG. 12 is a flowchart for describing a method for manufacturing the optical system according to a first embodiment.

Hereinafter, an overview of a method for manufacturing the optical system OL according to the first embodiment will be described with reference to FIG. 12. First, the respective lenses are disposed, the second lens group G2 which is the focusing group Gf that moves upon focusing, the diffractive optical element GD disposed on an object side of the focusing group Gf and the first lens group G1 including the negative lens element disposed on the object side of the diffractive optical element GD are prepared respectively (step S100) and disposed so as to satisfy conditions of the predetermined conditional expressions (e.g., aforementioned conditional expression (1-1)) (step S200).

Second Embodiment

Next, a second embodiment will be described. As shown in FIG. 1, an optical system OL according to the second embodiment is configured to include a focusing group Gf including at least two lens elements (e.g., a biconvex positive lens L21 and a biconcave negative lens L22 in FIG. 1) that move upon focusing. It is thereby possible to reduce fluctuations in axial chromatic aberration and spherical aberration accompanying focusing. The optical system OL is configured to include a diffractive optical element GD disposed on an object side of the focusing group Gf, a vibration-isolating group Gvr disposed on an image side of the focusing group Gf and configured to move so as to have a displacement component in a direction orthogonal to an optical axis and at least three negative lens elements (e.g., a biconcave negative lens L37, a negative meniscus lens L38 and a negative meniscus lens L311 in FIG. 1) disposed on the image side of the vibration-isolating group Gvr. It is thereby possible to reduce fluctuations in curvature of field and lateral chromatic aberration when image shake is corrected while successfully correcting axial chromatic aberration and spherical aberration. The lens element refers to each lens constituting a single lens or cemented lens.

Here, in the optical system OL according to the second embodiment, at least two of the three negative lens elements disposed on the image side of the vibration-isolating group Gvr are preferably specific negative lens elements that satisfy a conditional expression (2-1) shown below.

$$0.654 < \theta gF3n + 0.00168 \times vd3n \quad (2-1)$$

where, $\theta gF3n$: partial dispersion ratio of medium of specific negative lens element $vd3n$: Abbe number of medium of specific negative lens element on d-line where, the medium is glass, resin or the like, and glass is preferable. The same will apply hereinafter.

The conditional expression (2-1) defines a partial dispersion ratio and a dispersion of the medium used for the specific negative lens element. It is thereby possible to successfully correct axial and lateral chromatic aberrations while reducing the size of the optical system OL. Falling below a lower limit value of the conditional expression (2-1) causes correction of lateral chromatic aberration to become insufficient, which is therefore not preferable. The lower limit value of the conditional expression (2-1) is preferably set to 0.660 or more preferably to 0.664 to ensure the effects of the conditional expression (2-1).

The above specific negative lens element preferably satisfies a conditional expression (2-2) shown below.

$$1.98 < nd3n + 0.01 \times vd3n \quad (2-2)$$

where, $nd3n$: refractive index of medium of specific negative lens element on d-line $vd3n$: Abbe number of medium of specific negative lens element on d-line The conditional expression (2-2) defines a refractive index and a dispersion of a medium used for the specific negative lens element. It is thereby possible to successfully correct axial and lateral chromatic aberrations. Falling below a lower limit value of the conditional expression (2-2) causes the refractive index to become smaller with respect to the Abbe number, making it difficult to simultaneously correct spherical aberration and coma aberration, which is therefore not preferable. The lower limit value of the conditional expression (2-2) is preferably set to 1.99 or more preferably to 2.00 to ensure the effects of the conditional expression (2-2).

The optical system OL according to the second embodiment preferably satisfies a conditional expression (2-3) shown below.

$$TL/f < 0.61 \quad (2-3)$$

where,

TL: total length in infinity focusing state f: focal length of whole system in infinity focusing state The conditional expression (2-3) defines a ratio of a total length to a focal length of the whole system of the optical system OL in an infinity focusing state. It is thereby possible to successfully correct axial and lateral chromatic aberrations while reducing the size of the optical system OL. Exceeding the upper limit value of the conditional expression (2-3) increases the size of the optical system OL, and if measures such as reducing the number of lenses on the object side of the focusing group Gf or reducing the number of lenses on the image side of the vibration-isolating group Gvr are taken to be compatible with weight reduction, correction of lateral chromatic aberration becomes insufficient, which is therefore not preferable. The upper limit value of the conditional expression (2-3) is preferably set to 0.60 or more preferably to 0.59 to ensure the effects of the conditional expression (2-3). The lower limit value of the conditional expression (2-3) is preferably set to 0.55 or more preferably to 0.56 to ensure the effects of the conditional expression (2-3).

In the optical system OL according to the second embodiment, at least one of the aforementioned specific negative lens elements preferably satisfies a conditional expression (2-4) shown below.

$$70 < vd3n1 \quad (2-4)$$

$vd3n1$: Abbe number of medium of specific negative lens element on d-line

The conditional expression (2-4) defines a dispersion of the medium used for the specific negative lens element. It is thereby possible to successfully correct axial and lateral chromatic aberrations. Falling below a lower limit value of the conditional expression (2-4) causes correction of lateral chromatic aberration to become insufficient, which is therefore not preferable. The lower limit value of the conditional expression (2-4) is preferably set to 75 or more preferably to 80 to ensure the effects of the conditional expression (2-4).

In the optical system OL according to the second embodiment, at least one of the aforementioned specific negative lens elements preferably satisfies a conditional expression (2-5) shown below.

$$vd3n2 < 34 \quad (2-5)$$

where, vd3n2: Abbe number of medium of specific negative lens element on d-line

The conditional expression (2-5) defines a dispersion of a medium used for the specific negative lens element. It is thereby possible to successfully correct axial and lateral chromatic aberrations. Exceeding the upper limit value of the conditional expression (2-5) causes correction of axial chromatic aberration to become insufficient, which is therefore not preferable. The upper limit value of the conditional expression (2-5) is preferably set to 32 or more preferably to 30 to ensure the effects of the axial conditional expression (2-5).

The optical system OL according to the second embodiment preferably includes at least one specific positive lens element that satisfies a conditional expression (2-6) shown below on the image side of the vibration-isolating group Gvr.

$$\theta gF3p + 0.00168 \times vd3p1 < 0.664 \quad (2\text{-}6)$$

where,

θgF3p: partial dispersion ratio of medium of specific positive lens element vd3p1: Abbe number of medium of specific positive lens element on d-line The conditional expression (2-6) defines a partial dispersion ratio and dispersion of the medium used for the specific positive lens element. It is thereby possible to successfully correct axial and lateral chromatic aberrations. Exceeding an upper limit value of the conditional expression (2-6) causes correction of lateral chromatic aberration to become insufficient, which is therefore not preferable. The upper limit value of the conditional expression (2-6) is preferably set to 0.660 or more preferably to 0.654 to ensure the effects of the conditional expression (2-6).

In the optical system OL according to the second embodiment, the specific positive lens element preferably satisfies a conditional expression (2-7) shown below.

$$vd3p1 < 70 \quad (2\text{-}7)$$

where, vd3p1: Abbe number of medium of specific positive lens element on d-line

The conditional expression (2-7) defines a dispersion of the medium used for the specific positive lens element. It is thereby possible to successfully correct axial chromatic aberration. Exceeding an upper limit value of the conditional expression (2-7) causes correction of axial chromatic aberration to become insufficient, which is therefore not preferable. The upper limit value of the conditional expression (2-7) is preferably set to 55 or more preferably to 46 to ensure the effects of the conditional expression (2-7).

The optical system OL according to the second embodiment is configured to include a first cemented lens CL31, a second cemented lens CL32 and a third cemented lens CL33 on the image side of the vibration-isolating group Gvr, which are disposed in order from an object. It is thereby possible to successfully correct spherical aberration, distortion and curvature of field.

The optical system OL according to the second embodiment preferably satisfies a conditional expression (2-8) shown below.

$$-1.20 < f3c1/f3c2 < -0.80 \quad (2\text{-}8)$$

where, f3c1: focal length of first cemented lens CL31
f3c2: focal length of second cemented lens CL32

The conditional expression (2-8) defines a ratio of a focal length of the second cemented lens CL32 to that of the first cemented lens CL31 of the three cemented lenses. It is thereby possible to successfully correct spherical aberration, distortion and curvature of field. Falling below a lower limit value of the conditional expression (2-8) causes distances between the respective lenses and sensitivity to eccentricity to increase and makes it difficult to obtain optical performance in accordance with design values during manufacturing, which is therefore not preferable. The lower limit value of the conditional expression (2-8) is preferably set to −1.10 or more preferably to −1.00 to ensure the effects of the conditional expression (2-8). Exceeding an upper limit value of the conditional expression (2-8) causes Petzval's sum to become excessive, resulting in a negative curvature of field, which is therefore not preferable. The upper limit value of the conditional expression (2-8) is preferably set to −0.90 or more preferably to −0.95 to ensure the effects of the conditional expression (2-8).

The optical system OL according to the second embodiment preferably satisfies a conditional expression (2-9) shown below.

$$0.30 < f3c1/f3c3 < 0.50 \quad (2\text{-}9)$$

where, f3c1: focal length of first cemented lens CL31
f3c3: focal length of third cemented lens CL33

The conditional expression (2-9) defines a ratio of a focal length of the third cemented lens CL33 to that of the first cemented lens CL31. It is thereby possible to successfully correct spherical aberration and coma aberration. Exceeding an upper limit value of the conditional expression (2-9) causes distances between the respective lenses and sensitivity to eccentricity to increase, making it difficult to obtain optical performance in accordance with design values during manufacturing, which is therefore not preferable. The upper limit value of the conditional expression (2-9) is preferably set to 0.45 or more preferably to 0.44 to ensure the effects of the conditional expression (2-9). Falling below a lower limit value of the conditional expression (2-9) causes Petzval's sum to decrease, resulting in a positive curvature of field, which is therefore not preferable. The lower limit value of the conditional expression (2-9) is preferably set to 0.35 or more preferably to 0.40 to ensure the effects of the conditional expression (2-9).

In the optical system OL according to the second embodiment, at least one of the cemented lenses disposed on the image side of the vibration-isolating group Gvr preferably satisfies a conditional expression (2-10) and a conditional expression (2-11) shown below.

$$vd3p - vd3n < 10 \quad (2\text{-}10)$$

$$0.10 < nd3n - nd3p \quad (2\text{-}11)$$

where, vd3p: Abbe number of medium of positive lens element constituting cemented lens on d-line
vd3n: Abbe number of medium of negative lens element constituting cemented lens on d-line
nd3p: refractive index of medium of positive lens element constituting cemented lens on d-line
nd3n: refractive index of medium of negative lens element constituting cemented lens on d-line The conditional expression (2-10) and the conditional expression (2-11) define differences in dispersion and refractive index of the medium used for the positive lens elements and the negative lens elements constituting cemented lenses disposed on the image side of the vibration-isolating group Gvr. It is thereby possible to successfully correct axial and lateral chromatic aberrations, curvature of field aberration and distortion. Exceeding an upper limit value of the conditional expression (2-10) makes it difficult to correct a difference of spherical aberration for each wavelength and lateral chromatic aberration, which is therefore not preferable. The upper limit value of the conditional expression (2-10) is preferably set to 5 or more preferably to 3 to ensure the effects of the conditional expression (2-10). Falling below a lower limit value of the conditional expression (2-11) makes it difficult to simultaneously correct curvature of field and distortion, which is therefore not preferable. The lower limit value of the conditional expression (2-11) is preferably set to 0.15 or more preferably to 0.20 to ensure the effects of the conditional expression (2-11).

The optical system OL according to the second embodiment is preferably configured to include a first lens group G1 including the aforementioned diffractive optical element GD and having positive refractive power, a second lens group G2 which is a focusing group Gf that performs focusing by movement in an optical axis direction and having negative refractive power and a third lens group G3, which are disposed in order from an object. Here, the third lens group G3 is configured to include a third A group G3A, a third B group G3B which is the aforementioned vibration-isolating group Gvr and a third C group G3C including the aforementioned three cemented lenses, which are disposed in order from an object. It is thereby possible to successfully correct various aberrations including spherical aberration and axial chromatic aberration despite the fact that the total length is substantially short with respect to the focal length.

In the optical system OL according to the second embodiment, the second lens group G2 which is the focusing group Gf preferably includes a positive lens element that satisfies a conditional expression (2-12) shown below.

$$\nu d2p < 50 \quad (2\text{-}12)$$

where, $\nu d2p$: Abbe number of medium of positive lens element included in second lens group G2 on d-line The conditional expression (2-12) defines a relation between a partial dispersion ratio and a dispersion of the medium used for positive lens elements (e.g., the biconvex positive lens L21 in FIG. 1) included in the second lens group G2. It is thereby possible to successfully correct fluctuations in axial chromatic aberration and spherical aberration upon short distance focusing. Exceeding an upper limit value of the conditional expression (2-12) makes it difficult to correct axial chromatic aberration upon short distance focusing, which is therefore not preferable. The upper limit value of the conditional expression (2-12) is preferably set to 40 or more preferably to 35 to ensure the effects of the conditional expression (2-12).

Figure 13:
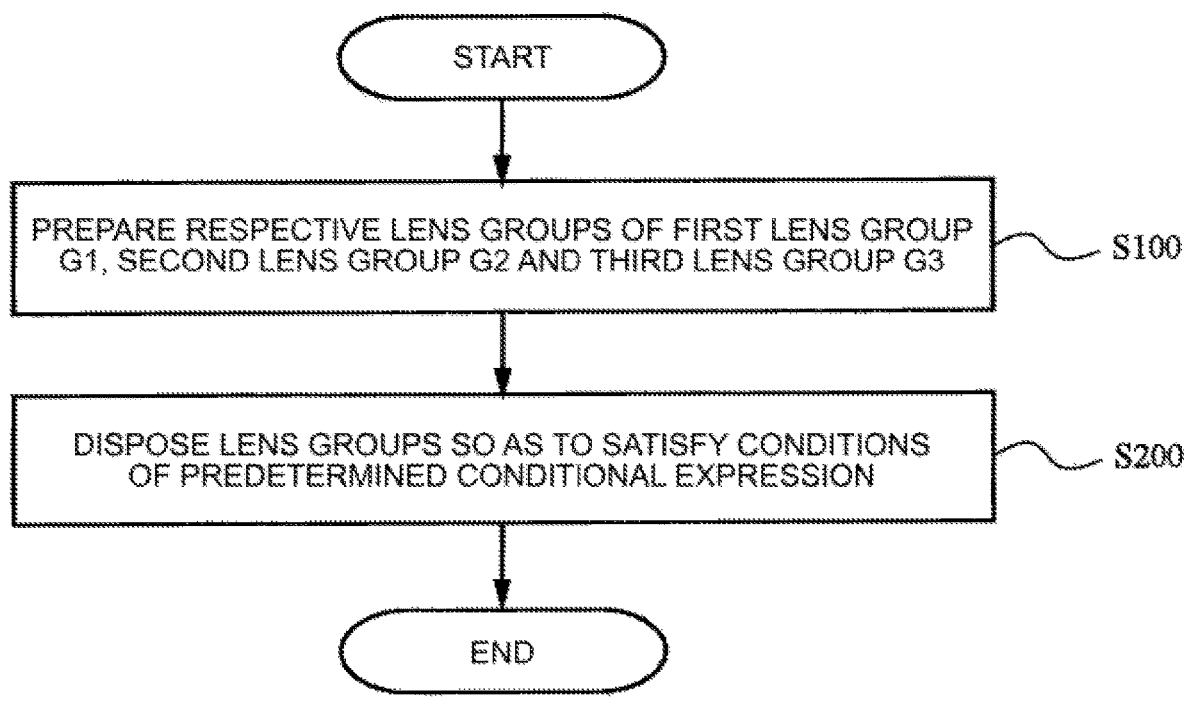
FIG. 13 is a flowchart for describing a method for manufacturing an optical system according to a second embodiment.

Hereinafter, an overview of a method for manufacturing the optical system OL according to the second embodiment will be described with reference to FIG. 13. First, the respective lenses are disposed, and the second lens group G2 which is the focusing group Gf that moves upon focusing, the first lens group G1 including the diffractive optical element GD disposed on an object side of the focusing group Gf, the vibration-isolating group Gvr which is disposed on the image side of the focusing group Gf and moves so as to have a displacement component in a direction orthogonal to an optical axis, and the third lens group G3 including at least three negative lens elements disposed on the image side of the vibration-isolating group Gvr are respectively prepared (step S100). These lens groups are disposed so as to satisfy the predetermined conditional expression (e.g., the aforementioned conditional expression (2-1)) (step S200).

The conditions and configurations described above respectively exert the aforementioned effects, but the lenses are not limited to those satisfying all the conditions and configurations, and even those lenses satisfying some of the conditions and configurations or a combination of any conditions and configurations can also obtain the aforementioned effects.

Figure 11:
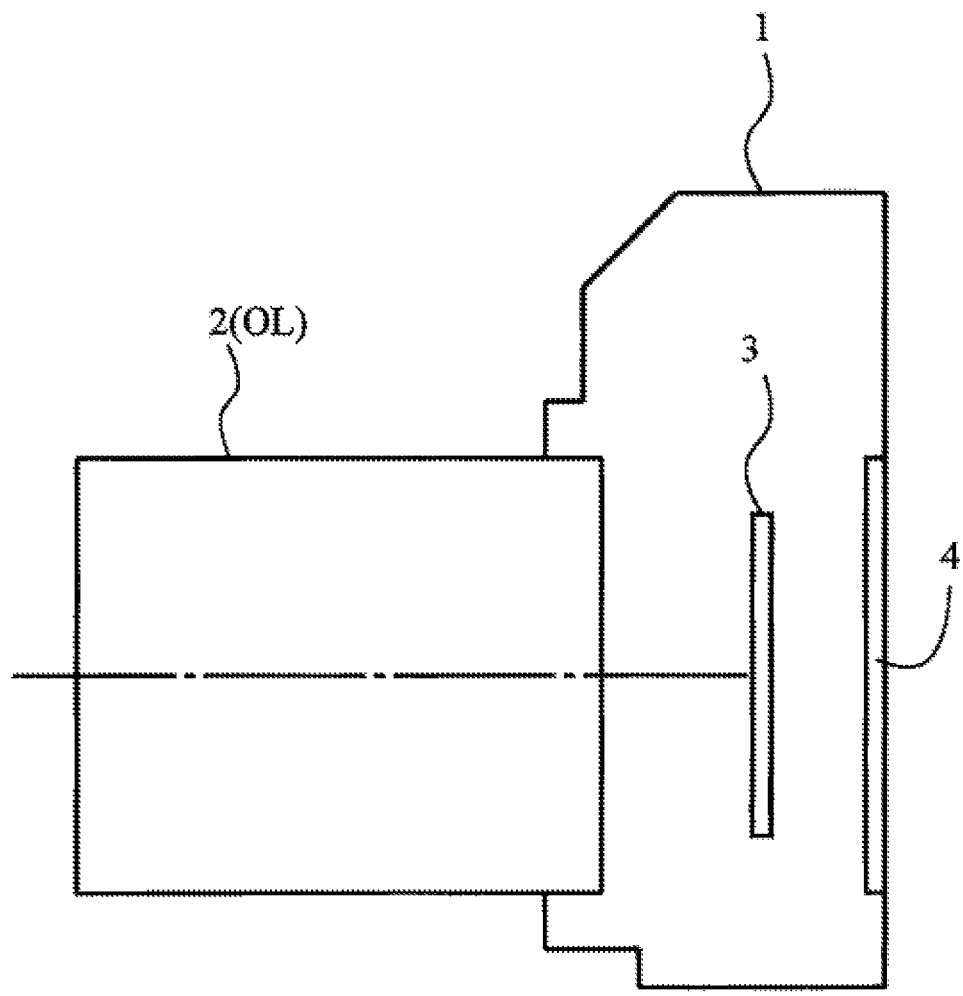
FIG. 11 is a cross-sectional view of a camera mounted with the above optical system.

Next, a camera which is an optical apparatus provided with the optical system OL according to the present embodiment will be described based on FIG. 11. This camera 1 is a lens interchangeable, so-called mirrorless camera provided with the optical system OL according to the present embodiment as an imaging lens 2. In the present camera 1, light from an object (subject) (not shown) is collected by the imaging lens 2 to form an image of the subject on an imaging surface of an imaging section 3 via an OLPF (optical low pass filter) (not shown). The subject image is photoelectrically converted by a photoelectric conversion element provided in the imaging section 3 and the image of the subject is thereby generated. This image is displayed on an EVF (electronic view finder) 4 provided for the camera 1. This allows a photographer to observe the subject via the EVF 4.

When the photographer presses a release button (not shown), the image photoelectrically converted by the imaging section 3 is stored in a memory (not shown). Thus, the photographer can capture an image of the subject using the camera 1. Although an example of a mirrorless camera has been described in the present embodiment, effects similar to those of the above camera 1 can also be achieved with a single-lens reflex type camera mounted with the optical system OL according to the present embodiment, which is provided with a quick return mirror in a camera body to observe a subject through a finder optical system.

The contents described below can be adopted as appropriate in such a range as not to deteriorate optical performance.

Although an optical system OL with a three-group configuration has been described in the present embodiment, the above configuration and conditions or the like are also applicable to a four-group, five-group or other group configuration. A configuration with a lens or lens group added on a side closest to the object or a configuration with a lens or lens group added on a side closest to the image may also be adopted. More specifically, a configuration may be conceived in which a lens group whose position with respect to the image surface is fixed on aside closest to the image surface upon zooming or upon focusing is added. The lens group refers to a part including at least one lens separated with an air distance which varies upon zooming or upon focusing. The lens component refers to a cemented lens made up of a single lens or a plurality of lenses cemented together.

A single lens group or a plurality of lens groups or a partial lens group may be moved in the optical axis direction to be formed into a focusing group which performs focusing from an infinite distant object point to a short distant object point. In this case, the focusing group is also applicable to auto focusing and is also suitable for motor driving (ultrasonic motor or the like) for auto focusing. It is particularly preferable to use at least part of the second lens group G2 as a focusing group and fix the positions of the other lenses with respect to the image surface upon focusing. With a load applied to the motor taken into consideration, the focusing lens group is preferably constructed of a cemented lens, but may also be constructed of a single lens.

The lens group or partial lens group may be moved so as to have a displacement component in a direction orthogonal to the optical axis or may be moved (swung) rotationally in an in-plane direction including the optical axis so as to serve as a vibration-isolating group that corrects image blur caused by image shake. It is particularly preferable to use at least part of the third lens group G3 as a vibration-isolating group.

Lens surfaces may be formed as spherical surfaces, plane surfaces or aspherical surfaces. When a lens surface is a spherical surface or a plane surface, lens working and assembly adjustment become easier, preventing deterioration of optical performance due to errors in working and assembly adjustment, which is therefore preferable. Even when an image surface is shifted, deterioration of description performance is small, which is therefore preferable. When a lens surface is an aspherical surface, the aspherical surface may be any one of an aspherical surface resulting from grinding work, a glass-mold aspherical surface which is glass molded into an aspherical shape and a composite type aspherical surface with resin formed into an aspherical shape on a glass surface. Lens surfaces may be refractive surfaces and lenses may be gradient index lenses (GRIN lenses) or plastic lenses.

An aperture stop S is preferably disposed in the neighborhood or within the third lens group G3, but the role of the aperture stop S may be substituted by a lens frame without providing any member as an aperture stop.

Each lens surface may be coated with an antireflective film exhibiting high transmissivity over a wide wavelength region to achieve high contrast and high optical performance while reducing flare or ghost.

When the above configuration is adopted, it is possible to provide an optical system, an optical apparatus and a method for manufacturing the optical system having satisfactory image forming performance.

EXAMPLES

Hereinafter, each example will be described based on the accompanying drawings. Note that FIG. 1, FIG. 3, FIG. 5, FIG. 7 and FIG. 9 are cross-sectional views illustrating configurations and refractive index distributions of the optical systems OL (OL1 to OL5) according to the respective examples.

In each example, a phase function φ of a diffractive optical surface is expressed by an expression (c) below.

$$\varphi(h,n) = (2\pi/(n \times \lambda 0)) \times (C2h^2 + C4h^4) \quad (c)$$

where,
h: height in vertical direction with respect to optical axis
n: order of diffracted light
λ0: design wavelength
Ci: phase coefficient (i=2, 4)

Refractive power φD of a diffractive optical surface expressed by an expression (c) corresponding to arbitrary wavelength λ, arbitrary diffraction order n is expressed by an expression (d) below using the lowest order phase coefficient C2.

$$\varphi D(\lambda,n) = -2 \times C2 \times n \times \lambda/\lambda 0 \quad (d)$$

In tables in the respective examples, a sign "*" is marked on the right side of each surface number of each diffractive optical surface.

Example 1

FIG. 1 is a diagram illustrating a configuration of an optical system OL1 according to Example 1. This optical system OL1 is provided with a first lens group G1 having positive refractive power, a second lens group G2 having negative refractive power, an aperture stop S and a third lens group G3 having negative refractive power, which are disposed in order from an object, the second lens group G2 being used as a focusing lens group Gf which is moved along the optical axis to perform focusing.

The first lens group G1 is constructed of a biconvex positive lens L11, a cemented positive lens resulting from cementing a biconvex positive lens L12 and a biconcave negative lens L13, a positive meniscus lens L14 having a concave surface facing the image, in which a close-contact multi layer type diffractive optical element GD using two different types of materials is formed on the concave surface, and a cemented negative lens resulting from cementing a negative meniscus lens L15 having a convex surface facing the object and a positive meniscus lens L16 having a convex surface facing the object, which are disposed in order from the object. The second lens group G2 is constructed of a cemented negative lens resulting from cementing a biconvex positive lens L21 and a biconcave negative lens L22, which are disposed in order from the object. The third lens group G3 is constructed of a cemented negative lens resulting from cementing a biconcave negative lens L31 and a biconvex positive lens L32, a cemented negative lens resulting from cementing a biconvex positive lens L33 and a biconcave negative lens L34, a biconcave negative lens L35, a cemented positive lens CL31 resulting from cementing a biconvex positive lens L36 and a biconcave negative lens L37, a cemented negative lens CL32 resulting from cementing a negative meniscus lens L38 having a convex surface facing the object and a positive meniscus lens L39 having a convex surface facing the object and a cemented positive lens CL33 resulting from cementing a biconvex positive lens L310 and a negative meniscus lens L311 having a concave surface facing the object, which are disposed in order from the object. A filter FL is disposed between the third lens group G3 and an image surface I.

In the optical system OL1 according to Example 1, the cemented negative lens resulting from cementing the biconvex positive lens L33 and the biconcave negative lens L34, and the biconcave negative lens L35 in the third lens group G3 are used as a vibration-isolating group Gvr. The optical system OL1 is configured to correct a change in the image position caused by vibration or the like of the optical system OL1 by moving the vibration-isolating group Gvr so as to have a displacement component in a direction orthogonal to an optical axis.

Table 1 below shows data values of the optical system OL1. In [General Data] shown in Table 1, f denotes a focal length of the whole system, FNO denotes an F number, ω denotes a half angle of view, and TL denotes a total length. Here, the total length TL represents a distance on the optical axis from a lens surface (first surface) closest to the object to the image surface I. A first column m in lens data represents lens surface order (surface number) from the object along a light traveling direction, a second column r represents a radius of curvature of each lens surface, a third column d represents a distance from each optical surface to the next optical surface (distance to the next lens surface) on the optical axis, a fourth column νd and a fifth column nd represent an Abbe number and a refractive index for a d-line (λ=587.6 nm), a sixth column θgF represents a partial dispersion ratio. A radius of curvature 0.0000 represents a plane surface and a refractive index of air 1.00000 is omitted. Note that a lens group focal length represents a number and focal length of a starting surface of the first to third lens groups G1 to G3.

Here, "mm" is generally used as the unit for the focal length f, the radius of curvature r, the distance to the next lens surface d and other lengths described in all the following data, but the unit is not limited to "mm" since equivalent optical performance is obtained even when an optical system is proportionally scaled. Explanations of these numerals and characters, and data are the same in the subsequent examples.

TABLE 1

Example 1
[General data]
f = 391.74403
FNo = 5.76593
ω = 3.12480
TL = 229.99999
[Lens data]

| m | r | d | vd | nd | θgF |
|---|---|---|----|----|-----|
| Object surface | ∞ | | | | |
| 1 | 90.5290 | 9.0224 | 70.32 | 1.487490 | 0.5291 |
| 2 | 3476.6214 | 0.2500 | | | |
| 3 | 108.6866 | 9.7966 | 70.32 | 1.487490 | 0.5291 |
| 4 | −237.7886 | 2.5000 | 44.46 | 1.612660 | 0.564 |
| 5 | 179.8167 | 2.5000 | | | |
| 6 | 80.0400 | 5.4497 | 64.13 | 1.516800 | 0.5357 |
| 7 | 140.7615 | 0.2000 | 33.36 | 1.527800 | 0.6291 |
| 8* | 140.7615 | 0.3000 | 49.98 | 1.557147 | 0.5688 |
| 9 | 140.7615 | 15.9286 | | | |
| 10 | 57.9333 | 2.0000 | 42.73 | 1.834810 | 0.5648 |
| 11 | 32.3388 | 9.3177 | 70.32 | 1.487490 | 0.5291 |
| 12 | 90.7740 | D1 | | | |
| 13 | 132.6572 | 4.1393 | 33.72 | 1.647690 | 0.593 |
| 14 | −523.0292 | 1.7000 | 50.27 | 1.719990 | 0.5527 |
| 15 | 67.7680 | D2 | | | |
| 16 | 0.0000 | 3.0000 | | | S |
| 17 | −434.3952 | 2.0000 | 46.59 | 1.816000 | 0.5567 |
| 18 | 23.9849 | 4.4832 | 58.82 | 1.518230 | 0.5449 |
| 19 | −100.9429 | 0.1000 | | | |
| 20 | 0.0000 | 1.0000 | | | |
| 21 | 397.4081 | 3.6000 | 25.45 | 1.805180 | 0.6157 |
| 22 | −96.5962 | 1.5000 | 67.90 | 1.593190 | 0.544 |
| 23 | 69.4057 | 1.5000 | | | |
| 24 | −199.5009 | 1.5000 | 67.90 | 1.593190 | 0.544 |
| 25 | 60.2877 | 4.0000 | | | |
| 26 | 33.8022 | 6.7774 | 39.21 | 1.595510 | 0.5806 |
| 27 | −23.0330 | 2.0000 | 82.57 | 1.497820 | 0.5386 |
| 28 | 49.4624 | 5.0000 | | | |
| 29 | 257.9794 | 2.0000 | 46.59 | 1.816000 | 0.5567 |
| 30 | 22.5049 | 4.5956 | 44.46 | 1.612660 | 0.564 |
| 31 | 76.0065 | 2.5663 | | | |
| 32 | 38.0090 | 9.7423 | 40.98 | 1.581440 | 0.5763 |
| 33 | −24.5636 | 2.0000 | 22.74 | 1.808090 | 0.6287 |
| 34 | −105.7609 | 9.1491 | | | |
| 35 | 0.0000 | 40.5814 | | | |
| 36 | 0.0000 | 2.0000 | 63.88 | 1.516800 | 0.536 |
| 37 | 0.0000 | BF | | | |
| Image surface | ∞ | | | | |

[Lens group focal length]

| Lens group | Starting surface | Focal length |
|---|---|---|
| First lens group | 1 | 120.3 |
| Second lens group | 13 | −175.5 |
| Third lens group | 16 | −81.2 |

In the optical system OL1, the 8th surface is a diffractive optical surface. Table 2 below shows diffractive optical surface data, that is, values of design wavelength λ0, order n and respective phase coefficients C2 and C4.

TABLE 2

[Diffractive optical surface data]

| m | λ0 | n | C2 | C4 |
|---|----|----|----|----|
| 8 | 587.6 | 1.0 | −5.00000E−05 | 3.46148E−10 |

In the optical system OL1, an axial air distance D1 between the first lens group G1 and the second lens group G2, an axial air distance D2 between the second lens group G2 and the third lens group G3 and a back focus BF vary upon focusing. Table 3 below shows variable distances in an infinity focusing state, an intermediate distance focusing state and a short distance focusing state. D0 denotes a distance to the object from a surface (first surface) closest to the object of the optical system OL1, f denotes a focal length, β denotes magnification and the back focus BF denotes a distance on the optical axis (air equivalent length) from an optical surface (37th surface) closest to the image to the image surface I (the same description will also apply to the subsequent examples).

TABLE 3

[Variable distance data]

| Focusing state | Infinite distance | Intermediate distance | Short distance |
|---|---|---|---|
| f | 391.74403 | — | — |
| β | — | −0.03333 | −0.22277 |
| D0 | ∞ | 11775.1260 | 1770.0002 |
| D1 | 7.61558 | 9.90206 | 24.63002 |
| D2 | 44.58471 | 42.29823 | 27.62027 |
| BF | 0.09999 | 0.10000 | 0.09999 |

Table 4 below shows each conditional expression corresponding value in the optical system OL1. Since the conditional expression (2-1) and the conditional expression (2-2) correspond to values of two specific negative lens elements, these expressions are shown side by side, separated by commas (,).

TABLE 4 fpf = 10000.0
[Conditional expression corresponding value]

(1-1)f/fpf = 0.039
(1-2)nd1 + 0.006 × vd1n = 1.879
(1-3)vd1n = 44.5
(1-4)TL/f = 0.587
(1-5)θgF1n + 0.00168 × vd1n = 0.639
(1-6)f1/f = 0.307
(1-7)f1/fpf = 0.012
(2-1)θgF3n + 0.00168 × vd3n = 0.677, 0.667
(2-2)nd3n + 0.01 × vd3n = 2.324, 2.035
(2-3)TL/f = 0.58
(2-4)vd3n1 = 82.57
(2-5)vd3n2 = 22.74
(2-6)θgFp1 + 0.00168 × vd3p1 = 0.042
(2-7)vd3p1 = 44.46
(2-8)f3c1/f3c2 = −1.12
(2-9)f3c1/f3c3 = 1.10
(2-10)vd3p − vd3n = −2.13
(2-11)nd3n − nd3p = 0.20
(2-12)vd2p = 33.72

Thus, the optical system OL1 satisfies the above conditional expressions (1-1) to (1-7), (2-1) to (2-8), (2-10) to (2-12).

Figure 2:
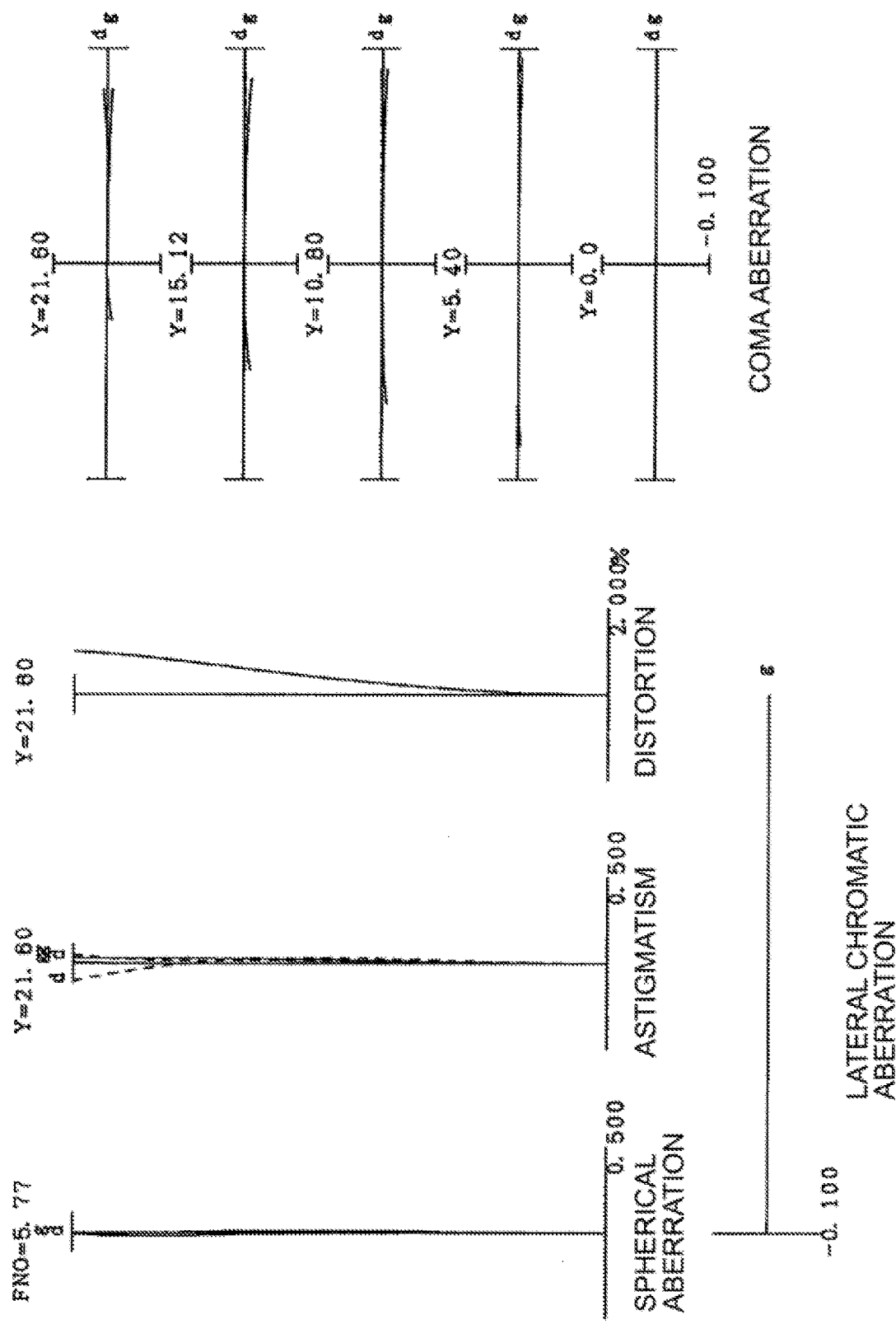
FIG. 2 illustrates graphs showing various aberrations of the optical system according to Example 1 in an infinity focusing state.

A spherical aberration graph, an astigmatism graph, a distortion graph, a lateral chromatic aberration graph and a coma aberration graph in an infinite focusing state in this optical system OL1 are shown in FIG. 2. In each aberration graph, FNO denotes an F number and Y denotes an image height. An F number value corresponding to a maximum diameter is shown in a spherical aberration graph, a maximum value of an image height is shown in an astigmatism graph and a distortion graph, and a value of each image height is shown in a coma aberration graph. A reference character d denotes a d-line ($\lambda$=587.6 nm) and g denotes a g-line ($\lambda$=435.8 nm). In the astigmatism graph, a solid line shows a sagittal image surface and a broken line shows a meridional image surface. In aberration graphs in the respective examples shown hereinafter, signs similar to those in the present example are used. It is clear from these aberration graphs that various aberrations have been successfully corrected from an infinity focusing state to a short distance focusing state in this optical system OL1.

Example 2

Figure 3:
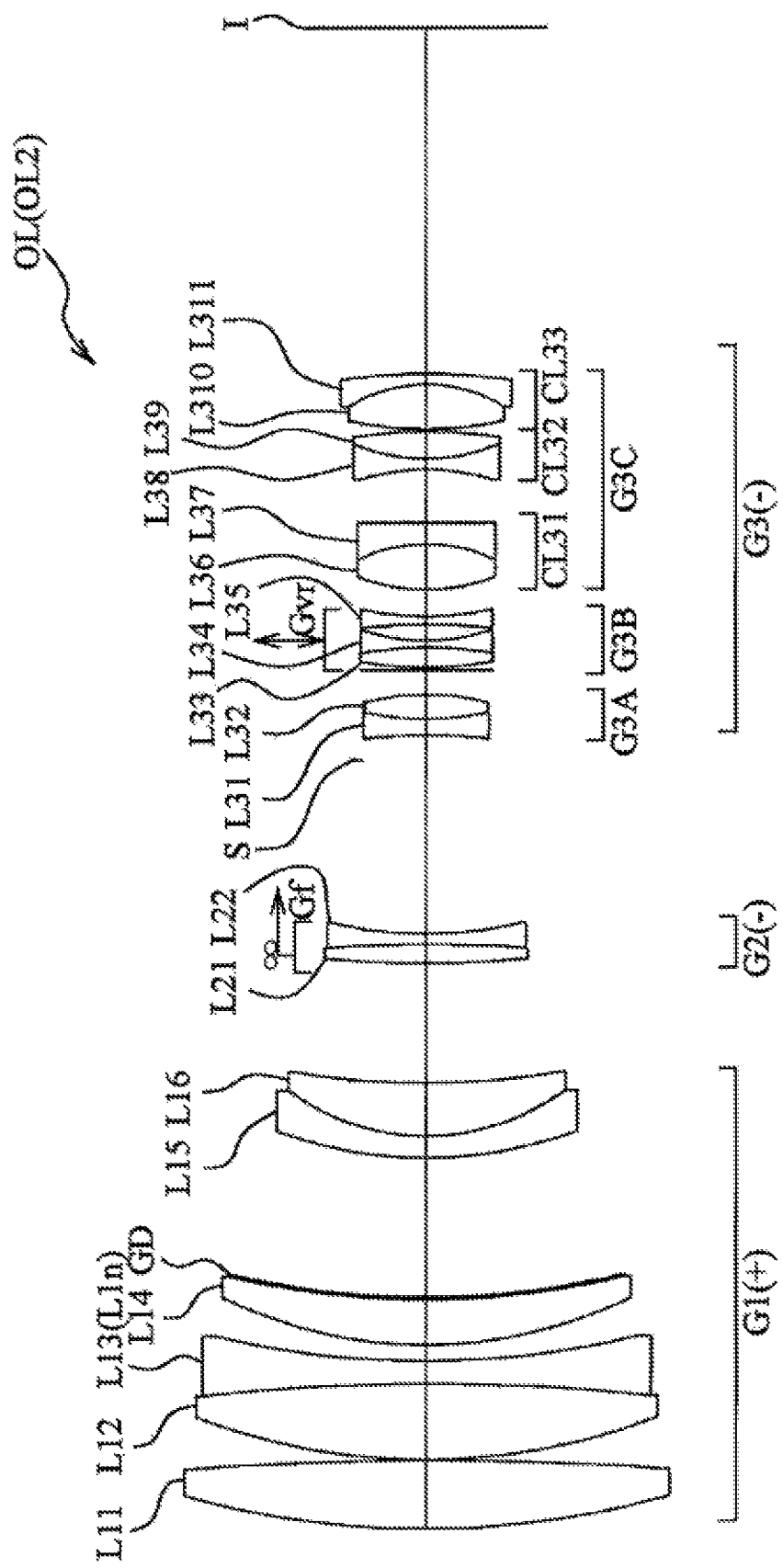
FIG. 3 is a cross-sectional view illustrating a lens configuration of an optical system according to Example 2 in an infinity focusing state.

FIG. 3 is a diagram illustrating a configuration of an optical system OL2 according to Example 2. This optical system OL2 is provided with a first lens group G1 having positive refractive power, a second lens group G2 having negative refractive power, an aperture stop S, and a third lens group G3 having negative refractive power, in order from the object, the second lens group G2 being used as a focusing lens group Gf which is moved along the optical axis to perform focusing.

The first lens group G1 is constructed of, in order from the object, a biconvex positive lens L11, a cemented positive lens resulting from cementing a biconvex positive lens L12 and a biconcave negative lens L13, a positive meniscus lens L14 having a concave surface facing the image, in which a close-contact multi layer type diffractive optical element GD using two different types of materials is formed and a cemented negative lens resulting from cementing a negative meniscus lens L15 having a convex surface facing the object and a positive meniscus lens L16 having a convex surface facing the object. The second lens group G2 is constructed of a cemented negative lens resulting from cementing a biconvex positive lens L21 and a biconcave negative lens L22, in order from the object. The third lens group G3 is constructed of, in order from the object, a cemented negative lens resulting from cementing a biconcave negative lens L31 and a biconvex positive lens L32, a cemented negative lens resulting from cementing a biconvex positive lens L33 and a biconcave negative lens L34, a biconcave negative lens L35, a cemented positive lens CL31 resulting from cementing a biconvex positive lens L36 and a negative meniscus lens L37 having a concave surface facing the object, a cemented negative lens CL32 resulting from cementing a biconcave negative lens L38 and a biconvex positive lens L39, and a cemented positive lens CL33 resulting from cementing a biconvex positive lens L310 and a negative meniscus lens L311 having a concave surface facing the object.

In the optical system OL2 according to Example 2, the cemented negative lens resulting from cementing the biconvex positive lens L33 and the biconcave negative lens L34, and the biconcave negative lens L35 in the third lens group G3 are used as a vibration-isolating group Gvr. The optical system OL2 is configured to correct a change in the image position caused by vibration or the like of the optical system OL2 by moving the vibration-isolating group Gvr so as to have a displacement component in a direction orthogonal to an optical axis.

Table 5 below shows data values of the optical system OL2.

TABLE 5

Example 2
[General data]
f = 489.70405
FNo = 5.75019
$\omega$ = 2.51062
TL = 279.32422
[Lens data]

| m | r | d | vd | nd | θgF |
|---|---|---|---|---|---|
| Object surface | ∞ | | | | |
| 1 | 170.0946 | 12.8000 | 70.31 | 1.487490 | 0.5291 |
| 2 | −624.7082 | 0.1000 | | | |
| 3 | 122.1897 | 14.2000 | 70.31 | 1.487490 | 0.5291 |
| 4 | −397.5861 | 4.2000 | 44.46 | 1.612660 | 0.564 |
| 5 | 168.6766 | 3.0000 | | | |
| 6 | 87.1890 | 8.4000 | 64.13 | 1.516800 | 0.5356 |
| 7 | 159.3794 | 0.2000 | 33.41 | 1.527800 | 0.6329 |
| 8* | 159.3794 | 0.3000 | 49.74 | 1.557100 | 0.5625 |
| 9 | 159.3794 | 25.8964 | | | |
| 10 | 82.0499 | 4.0475 | 40.66 | 1.883000 | 0.5669 |
| 11 | 44.0296 | 9.9231 | 70.31 | 1.487490 | 0.5291 |
| 12 | 159.8899 | D1 | | | |
| 13 | 213.6406 | 3.5000 | 33.73 | 1.647690 | 0.5931 |
| 14 | −289.8235 | 2.0000 | 50.27 | 1.719990 | 0.5527 |
| 15 | 81.1056 | D2 | | | |
| 16 | 0.0000 | 4.6833 | | | S |
| 17 | −96.9087 | 3.0000 | 46.59 | 1.816000 | 0.5567 |
| 18 | 54.5734 | 4.5000 | 58.82 | 1.518230 | 0.5449 |
| 19 | −47.3825 | 4.5000 | | | |
| 20 | 0.0000 | 0.5000 | | | |
| 21 | 63.6526 | 3.8251 | 36.40 | 1.620040 | 0.5878 |
| 22 | −67.1997 | 1.2000 | 82.57 | 1.497820 | 0.5386 |
| 23 | 38.7110 | 3.0000 | | | |
| 24 | −104.6546 | 1.5000 | 67.90 | 1.593190 | 0.544 |
| 25 | 57.0672 | 5.0000 | | | |
| 26 | 36.2961 | 8.4742 | 41.51 | 1.575010 | 0.5765 |
| 27 | −29.7475 | 4.0000 | 82.57 | 1.497820 | 0.5386 |
| 28 | −944.5222 | 9.8861 | | | |
| 29 | −43.9902 | 2.0000 | 46.59 | 1.816000 | 0.5567 |
| 30 | 36.4672 | 4.9460 | 44.46 | 1.612660 | 0.564 |
| 31 | −108.4507 | 0.5000 | | | |
| 32 | 69.7069 | 8.3459 | 40.98 | 1.581440 | 0.5763 |
| 33 | −27.7792 | 2.0000 | 22.74 | 1.808090 | 0.6288 |
| 34 | −105.8102 | BF | | | |
| Image surface | ∞ | | | | |

[Lens group focal length]

| Lens group | Starting surface | Focal length |
|---|---|---|
| First lens group | 1 | 158.7 |
| Second lens group | 13 | −166.5 |
| Third lens group | 16 | −108.5 |

In the optical system OL2, the 8th surface is a diffractive optical surface. Table 6 below shows diffractive optical surface data.

TABLE 6

[Diffractive optical surface data]

| m | λ0 | n | C2 | C4 |
|---|---|---|---|---|
| 8 | 587.6 | 1.0 | −4.25304E−05 | 3.00000E−10 |

In the optical system OL2, an axial air distance D1 between the first lens group G1 and the second lens group G2, an axial air distance D2 between the second lens group G2 and the third lens group G3 and a back focus BF vary upon focusing. Table 7 below shows variable distances in an infinity focusing state, an intermediate distance focusing state and a short distance focusing state.

TABLE 7

[Variable distance data]

| Focusing state | Infinite distance | Intermediate distance | Short distance |
|---|---|---|---|
| f | 489.70405 | — | — |
| β | — | −0.03333 | −0.18012 |
| D0 | ∞ | 14704.2290 | 2720.0000 |
| D1 | 22.24696 | 25.12411 | 39.16215 |
| D2 | 32.25305 | 29.35590 | 15.39786 |
| BF | 64.39657 | 64.40466 | 64.43514 |

Table 8 below shows each conditional expression corresponding value in the optical system OL2.

TABLE 8 fpf = 11756.3
[Conditional expression corresponding value]

(1-1)f/fpf = 0.038
(1-2)nd1 + 0.006 × vd1n = 1.879
(1-3)vd1n = 44.5
(1-4)TL/f = 0.582
(1-5)θgF1n + 0.00168 × vd1n = 0.639
(1-6)f1/f = 0.315
(1-7)f1/fpf = 0.012
(2-1)θgF3n + 0.00168 × vd3n = 0.677, 0.667
(2-2)nd3n + 0.01 × vd3n = 2.324, 2.035
(2-3)TL/f = 0.57
(2-4)vd3n1 = 82.57
(2-5)vd3n2 = 22.74
(2-6)θgFp1 + 0.00168 × vd3p1 = 0.042
(2-7)vd3p1 = 44.46
(2-8)f3c1/f3c2 = −0.97
(2-9)f3c1/f3c3 = 0.42
(2-10)vd3p − vd3n = −2.13
(2-11)nd3n − nd3p = 0.20
(2-12)vd2p = 33.72

Thus, the optical system OL2 satisfies the above conditional expressions (1-1) to (1-7), (2-1) to (2-12).

Figure 4:
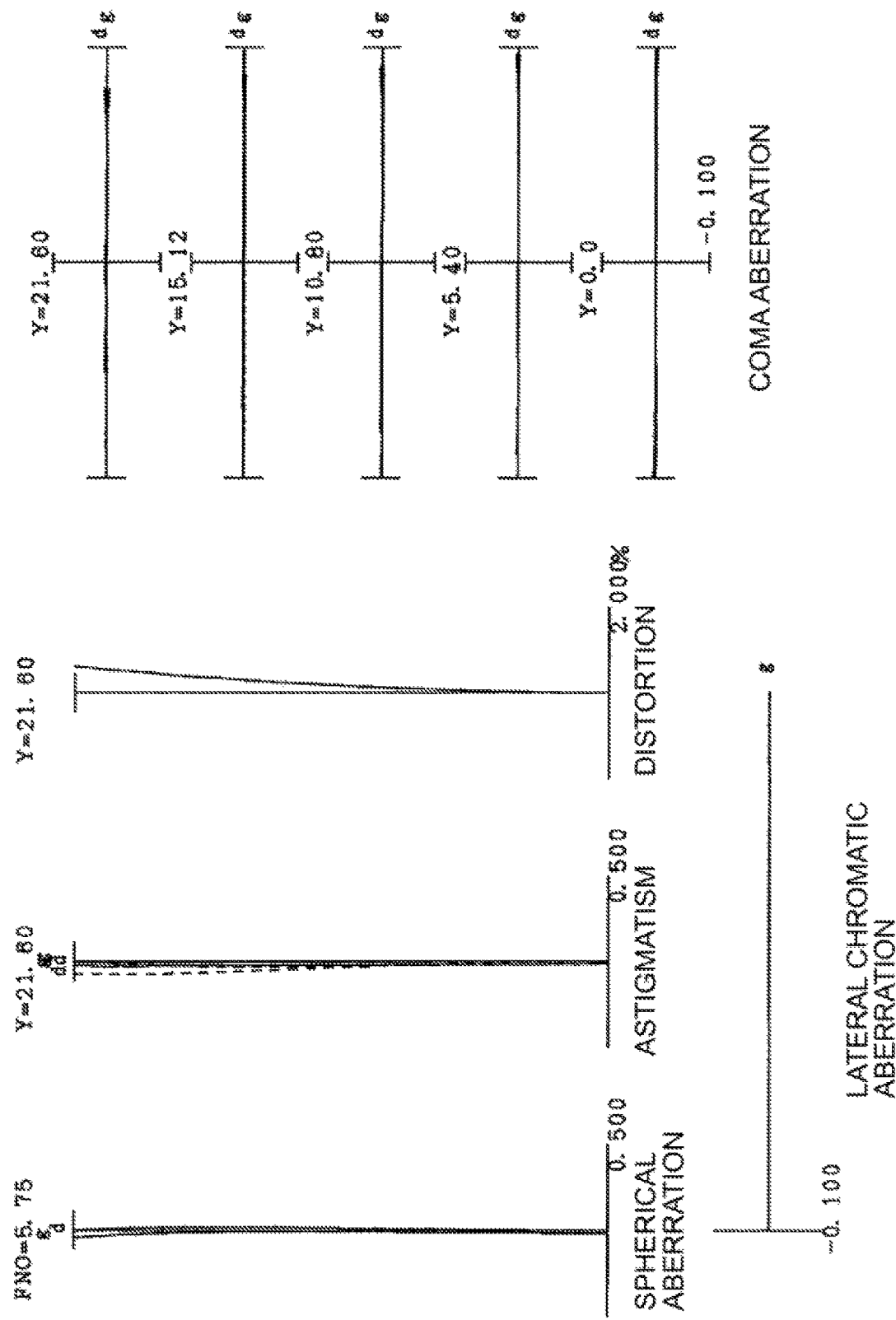
FIG. 4 illustrates graphs showing various aberrations of the optical system according to Example 2 in an infinity focusing state.

A spherical aberration graph, an astigmatism graph, a distortion graph, a lateral chromatic aberration graph and a coma aberration graph in an infinite focusing state of the optical system OL2 are shown in FIG. 4. It is clear from these aberration graphs that various aberrations have been successfully corrected from an infinity focusing state to a short distance focusing state in this optical system OL2.

Example 3

Figure 5:
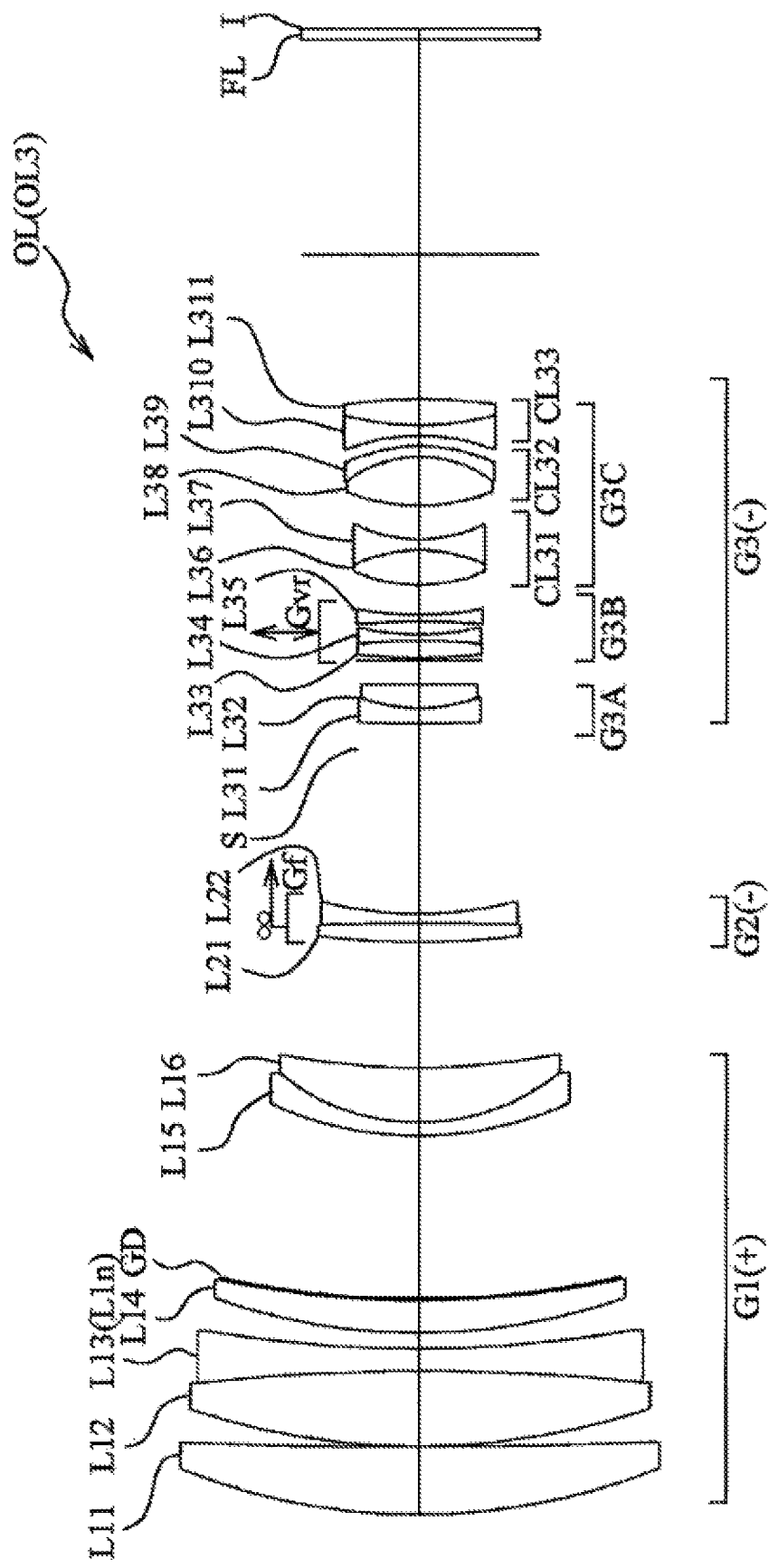
FIG. 5 is a cross-sectional view illustrating a lens configuration of an optical system according to Example 3 in an infinity focusing state.

FIG. 5 is a diagram illustrating a configuration of an optical system OL3 according to Example 3. This optical system OL3 is provided with, in order from an object, a first lens group G1 having positive refractive power, a second lens group G2 having negative refractive power, an aperture stop S and a third lens group G3 having negative refractive power, the second lens group G2 being used as a focusing lens group Gf which is moved along the optical axis to perform focusing.

The first lens group G1 is constructed of, in order from the object, a positive meniscus lens L11 having a convex surface facing the object, a cemented positive lens resulting from cementing a biconvex positive lens L12 and a biconcave negative lens L13, a positive meniscus lens L14 having a concave surface facing the image, in which a close-contact multi layer type diffractive optical element GD using two different types of materials is formed, and a cemented positive lens resulting from cementing a negative meniscus lens L15 having a convex surface facing the object and a positive meniscus lens L16 having a convex surface facing the object. The second lens group G2 is constructed of a cemented negative lens resulting from cementing a biconvex positive lens L21 and a biconcave negative lens L22, in order from the object. The third lens group G3 is constructed of, in order from the object, a cemented negative lens resulting from cementing a negative meniscus lens L31 having a convex surface facing the object and a biconvex positive lens L32, a cemented negative lens resulting from cementing a biconvex positive lens L33 and a biconcave negative lens L34, a biconcave negative lens L35, a cemented positive lens CL31 resulting from cementing a biconvex positive lens L36 and a biconcave negative lens L37, a cemented positive lens CL32 resulting from cementing a biconvex positive lens L38 and a negative meniscus L39 having a concave surface facing the object, and a cemented negative lens CL33 resulting from cementing a biconcave negative lens L310 and a biconvex positive lens L311. A filter FL is disposed between the third lens group G3 and an image surface I.

In the optical system OL3 according to Example 3, the cemented negative lens resulting from cementing the biconvex positive lens L33 and the biconcave negative lens L34, and the biconcave negative lens L35 in the third lens group G3 are used as a vibration-isolating group Gvr. The optical system OL3 is configured to correct a change in the image position caused by vibration or the like of the optical system OL3 by moving the vibration-isolating group Gvr so as to have a displacement component in a direction orthogonal to an optical axis.

Table 9 below shows data values of the optical system OL3.

TABLE 9

Example 3
[General data]
f = 489.60699
FNo = 5.77358
ω = 2.50102
TL = 280.00477
[Lens data]

| m | r | d | vd | nd | θgF | |
|---|---|---|---|---|---|---|
| Object surface | ∞ | | | | | |
| 1 | 122.9476 | 12.8000 | 70.32 | 1.487490 | 0.5291 | |
| 2 | 1170.7859 | 0.1000 | | | | |
| 3 | 138.4197 | 14.2000 | 70.32 | 1.487490 | 0.5291 | |
| 4 | −404.2440 | 4.2000 | 44.46 | 1.612660 | 0.564 | |
| 5 | 239.1102 | 3.0000 | | | | |
| 6 | 119.7261 | 6.0000 | 64.13 | 1.516800 | 0.5356 | |
| 7 | 182.0193 | 0.2000 | 33.36 | 1.527800 | 0.6291 | |
| 8* | 182.0193 | 0.3000 | 49.98 | 1.557147 | 0.5688 | |
| 9 | 182.0193 | 30.5473 | | | | |
| 10 | 68.0810 | 2.5000 | 40.66 | 1.883000 | 0.5668 | |
| 11 | 42.3028 | 10.3591 | 70.32 | 1.487490 | 0.5291 | |
| 12 | 139.6949 | D1 | | | | |
| 13 | 160.1874 | 3.5000 | 31.16 | 1.688930 | 0.5993 | |
| 14 | −763.1227 | 1.8000 | 49.26 | 1.743200 | 0.5526 | |
| 15 | 72.3797 | D2 | | | | |
| 16 | 0.0000 | 4.6833 | | | | S |
| 17 | 184.5427 | 3.0000 | 35.72 | 1.902650 | 0.5804 | |
| 18 | 32.0345 | 4.5000 | 46.48 | 1.582670 | 0.5663 | |
| 19 | −1347.5920 | 4.5000 | | | | |
| 20 | 0.0000 | 0.5000 | | | | |
| 21 | 108.6182 | 3.2000 | 33.72 | 1.647690 | 0.593 | |
| 22 | −132.3745 | 1.2000 | 70.32 | 1.487490 | 0.5291 | |
| 23 | 51.5472 | 2.4500 | | | | |

TABLE 9-continued

Example 3
[General data]
f = 489.60699
FNo = 5.77358
ω = 2.50102
TL = 280.00477

[Lens data]

| | | | | | |
|---|---|---|---|---|---|
| 24 | −139.0671 | 1.3000 | 67.90 | 1.593190 | 0.544 |
| 25 | 71.8302 | 5.5639 | | | |
| 26 | 30.9587 | 6.5741 | 44.46 | 1.612660 | 0.564 |
| 27 | −29.7499 | 2.0000 | 67.90 | 1.593190 | 0.544 |
| 28 | 27.3446 | 6.3892 | | | |
| 29 | 38.2118 | 9.2060 | 40.98 | 1.581440 | 0.5763 |
| 30 | −22.9829 | 2.0000 | 22.74 | 1.808090 | 0.6287 |
| 31 | −33.7014 | 1.9429 | | | |
| 32 | −39.4851 | 2.0000 | 40.66 | 1.883000 | 0.5668 |
| 33 | 57.7841 | 4.8763 | 44.46 | 1.612660 | 0.564 |
| 34 | −105.7143 | 27.2264 | | | |
| 35 | 0.0000 | 40.5814 | | | |
| 36 | 0.0000 | 2.0000 | 63.88 | 1.516800 | 0.536 |
| 37 | 0.0000 | BF | | | |
| Image surface | ∞ | | | | |

[Lens group focal length]

| Lens group | Starting surface | Focal length |
|---|---|---|
| First lens group | 1 | 156.0 |
| Second lens group | 13 | −169.5 |
| Third lens group | 16 | −102.5 |

In the optical system OL3, the 8th surface is a diffractive optical surface. Table 10 below shows diffractive optical surface data.

TABLE 10

[Diffractive optical surface data]

| m | λ0 | n | C2 | C4 |
|---|---|---|---|---|
| 8 | 587.6 | 1.0 | −4.00000E−05 | 3.00000E−10 |

In the optical system OL3, an axial air distance D1 between the first lens group G1 and the second lens group G2, an axial air distance D2 between the second lens group G2 and the third lens group G3 and a back focus BF vary upon focusing. Table 11 below shows variable distances in an infinity focusing state, an intermediate distance focusing state and a short distance focusing state.

TABLE 11

[Variable distance data]

| Focusing state | Infinite distance | Intermediate distance | Short distance |
|---|---|---|---|
| f | 489.60699 | — | — |
| β | — | −0.03333 | −0.17907 |
| D0 | ∞ | 14688.0010 | 2720.0000 |
| D1 | 23.65867 | 26.53105 | 40.54928 |
| D2 | 31.04134 | 28.15895 | 14.21073 |
| BF | 0.10477 | 0.11361 | 0.14305 |

Table 12 below shows each conditional expression corresponding value in the optical system OL3.

TABLE 12 fpf = 12500.0
[Conditional expression corresponding value]

(1-1)f/fpf = 0.042
(1-2)nd1 + 0.006 × vd1n = 1.879
(1-3)vd1n = 44.5
(1-4)TL/f = 0.572
(1-5)θgF1n + 0.00168 × vd1n = 0.639
(1-6)f1/f = 0.324
(1-7)f1/fpf = 0.014
(2-1)θgF3n + 0.00168 × vd3n = 0.658, 0.667
(2-2)nd3n + 0.01 × vd3n = 2.272, 2.035
(2-3)TL/f = 0.57
(2-4)vd3n1 = 67.90
(2-5)vd3n2 = 22.74
(2-6)θgFp1 + 0.00168 × vd3p1 = 0.042
(2-7)vd3p1 = 44.46
(2-8)f3c1/f3c2 = 27.82
(2-9)f3c1/f3c3 = −20.67
(2-10)vd3p − vd3n = 3.80
(2-11)nd3n − nd3p = 0.27
(2-12)vd2p = 31.16

Thus, the optical system OL3 satisfies the above conditional expressions (1-1) to (1-7), (2-1) to (2-3), (2-5) to (2-7), (2-9) to (2-12).

Figure 6:
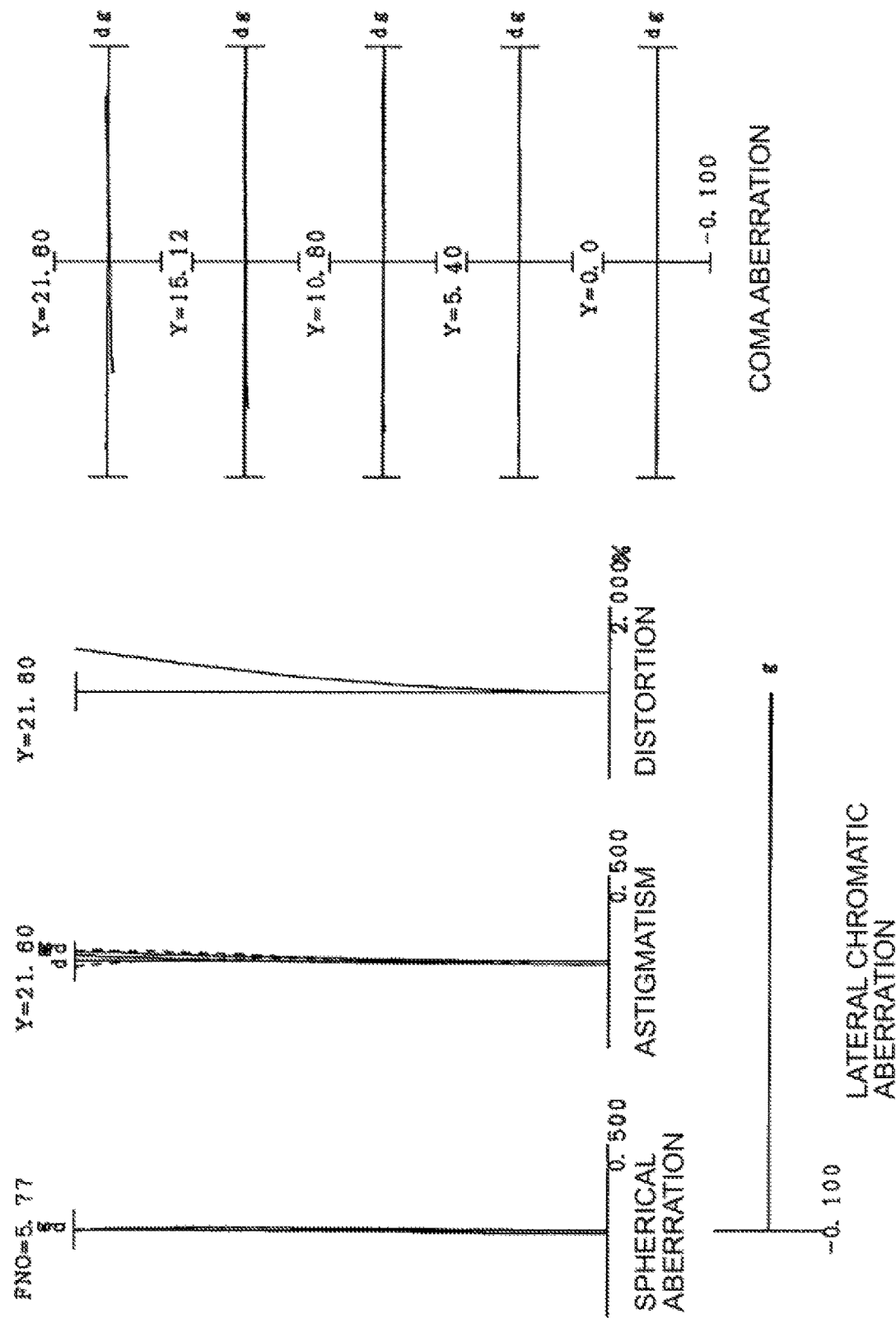
FIG. 6 illustrates graphs showing various aberrations of the optical system according to Example 3 in an infinity focusing state.

A spherical aberration graph, an astigmatism graph, a distortion graph, a lateral chromatic aberration graph and a coma aberration graph in an infinite focusing state of the optical system OL3 are shown in FIG. 6. It is clear from these aberration graphs that various aberrations have been successfully corrected from an infinity focusing state to a short distance focusing state in this optical system OL3.

Example 4

Figure 7:
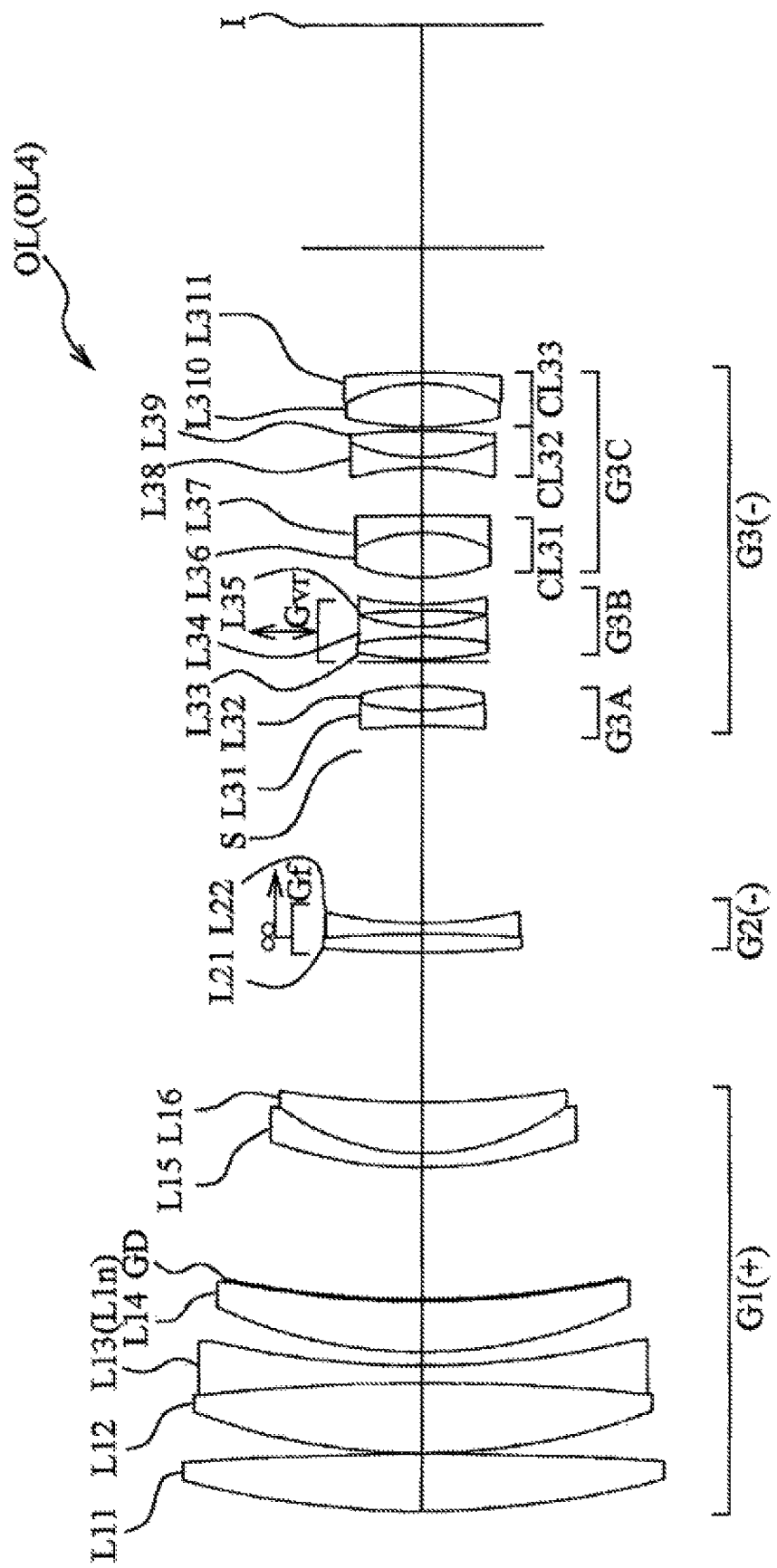
FIG. 7 is a cross-sectional view illustrating a lens configuration of an optical system according to Example 4 in an infinity focusing state.

FIG. 7 is a diagram illustrating a configuration of an optical system OL4 according to Example 4. This optical system OL4 is provided with, in order from an object, a first lens group G1 having positive refractive power, a second lens group G2 having negative refractive power, an aperture stop S and a third lens group G3 having negative refractive power, the second lens group G2 being used as a focusing lens group Gf which is moved along the optical axis to perform focusing.

The first lens group G1 is constructed of, in order from the object, a biconvex positive lens L11, a cemented positive lens resulting from cementing a biconvex positive lens L12 and a biconcave negative lens L13, a positive meniscus lens L14 having a concave surface facing the image, in which a close-contact multi layer type diffractive optical element GD using two different types of materials is formed and a cemented negative lens resulting from cementing a negative meniscus lens L15 having a convex surface facing the object and a positive meniscus lens L16 having a convex surface facing the object. The second lens group G2 is constructed of a cemented negative lens resulting from cementing a biconvex positive lens L21 and a biconcave negative lens L22, in order from the object. The third lens group G3 is constructed of, in order from the object, a cemented negative lens resulting from cementing a biconcave negative lens L31 and a biconvex positive lens L32, a cemented negative lens resulting from cementing a biconvex positive lens L33 and a biconcave negative lens L34, a biconcave negative lens L35, a cemented positive lens resulting from cementing a biconvex positive lens L36 and a negative meniscus lens L37 having a concave surface facing the object, a cemented negative lens resulting from cementing a biconcave negative lens L38 and a biconvex positive lens L39 and a cemented positive lens resulting from cementing a biconvex positive lens L310 and a negative meniscus lens L311 having a concave surface facing the object.

In the optical system OL4 according to Example 4, the cemented negative lens resulting from cementing the biconvex positive lens L33 and the biconcave negative lens L34, and the biconcave negative lens L35 in the third lens group G3 are used as a vibration-isolating group Gvr. The optical system OL4 is configured to correct a change in the image position caused by vibration or the like of the optical system OL4 by moving the vibration-isolating group Gvr so as to have a displacement component in a direction orthogonal to an optical axis.

Table 13 below shows data values of the optical system OL4.

TABLE 13

Example 4
[General data]
f = 489.86648
FNo = 5.88304
ω = 2.51193
TL = 279.31858
[Lens data]

| m | r | d | vd | nd | θgF |
|---|---|---|---|---|---|
| Object surface | ∞ | | | | |
| 1 | 177.9322 | 10.7424 | 70.31 | 1.487490 | 0.5291 |
| 2 | −684.2028 | 0.1000 | | | |
| 3 | 122.4566 | 13.2172 | 70.31 | 1.487490 | 0.5291 |
| 4 | −434.8886 | 3.3400 | 44.46 | 1.612660 | 0.564 |
| 5 | 175.1561 | 2.5000 | | | |
| 6 | 93.5593 | 9.5000 | 64.13 | 1.516800 | 0.5356 |
| 7 | 182.0193 | 0.2000 | 33.41 | 1.527800 | 0.6329 |
| 8* | 182.0193 | 0.3000 | 49.74 | 1.557100 | 0.5625 |
| 9 | 182.0193 | 24.6299 | | | |
| 10 | 85.2289 | 2.7000 | 40.66 | 1.883000 | 0.5669 |
| 11 | 46.6951 | 9.6422 | 70.31 | 1.487490 | 0.5291 |
| 12 | 167.4939 | D1 | | | |
| 13 | 213.7194 | 3.5000 | 33.73 | 1.647690 | 0.5931 |
| 14 | −215.1271 | 2.0000 | 50.27 | 1.719990 | 0.5527 |
| 15 | 81.1151 | D2 | | | |
| 16 | 0.0000 | 4.6833 | | | S |
| 17 | −108.6991 | 3.0000 | 46.59 | 1.816000 | 0.5567 |
| 18 | 51.7879 | 4.5000 | 58.82 | 1.518230 | 0.5449 |
| 19 | −47.3380 | 4.5000 | | | |
| 20 | 0.0000 | 0.5000 | | | |
| 21 | 58.5515 | 4.1845 | 36.40 | 1.620040 | 0.5878 |
| 22 | −71.0652 | 2.0000 | 82.57 | 1.497820 | 0.5386 |
| 23 | 34.7292 | 3.0000 | | | |
| 24 | −96.6917 | 1.2000 | 67.90 | 1.593190 | 0.544 |
| 25 | 57.7620 | 5.0000 | | | |
| 26 | 36.6409 | 8.3877 | 41.51 | 1.575010 | 0.5765 |
| 27 | −29.6683 | 3.2259 | 82.57 | 1.497820 | 0.5386 |
| 28 | −506.0649 | 8.9942 | | | |
| 29 | −47.7973 | 2.0000 | 46.59 | 1.816000 | 0.5567 |
| 30 | 34.9739 | 5.0330 | 44.46 | 1.612660 | 0.564 |
| 31 | −108.0742 | 0.6389 | | | |
| 32 | 61.8976 | 8.2352 | 40.98 | 1.581440 | 0.5763 |
| 33 | −29.6045 | 2.0000 | 22.74 | 1.808090 | 0.6288 |
| 34 | −156.7818 | 23.3642 | | | |
| 35 | 0.0000 | BF | | | |
| Image surface | ∞ | | | | |

[Lens group focal length]

| Lens group | Starting surface | Focal length |
|---|---|---|
| First lens group | 1 | 160.3 |
| Second lens group | 13 | −164.1 |
| Third lens group | 16 | −111.5 |

In the optical system OL4, the 8th surface is a diffractive optical surface. Table 14 below shows diffractive optical surface data.

TABLE 14

[Diffractive optical surface data]

| m | λ0 | n | C2 | C4 |
|---|---|---|---|---|
| 8 | 587.6 | 1.0 | −4.06169E−05 | 3.00000E−10 |

In the optical system OL4, an axial air distance D1 between the first lens group G1 and the second lens group G2, an axial air distance D2 between the second lens group G2 and the third lens group G3 and a back focus BF vary upon focusing. Table 15 below shows variable distances in an infinity focusing state, an intermediate distance focusing state and a short distance focusing state.

TABLE 15

[Variable distance data]

| Focusing state | Infinite distance | Intermediate distance | Short distance |
|---|---|---|---|
| f | 489.86648 | — | — |
| β | — | −0.03333 | −0.18008 |
| D0 | ∞ | 14707.6860 | 2720.0000 |
| D1 | 28.11673 | 30.99524 | 45.01048 |
| D2 | 32.38327 | 29.48476 | 15.54952 |
| BF | 42.00002 | 42.00002 | 42.00002 |

Table 16 below shows each conditional expression corresponding value in the optical system OL4.

TABLE 16 fpf = 12310.1
[Conditional expression corresponding value]

(1-1)f/fpf = 0.040
(1-2)nd1 + 0.006 × vd1n = 1.879
(1-3)vd1n = 44.5
(1-4)TL/f = 0.570
(1-5)θgF1n + 0.00168 × vd1n = 0.639
(1-6)f1/f = 0.327
(1-7)f1/fpf = 0.013
(2-1)θgF3n + 0.00168 × vd3n = 0.677, 0.667
(2-2)nd3n + 0.01 × vd3n = 2.324, 2.035
(2-3)TL/f = 0.57
(2-4)vd3n1 = 82.57
(2-5)vd3n2 = 22.74
(2-6)θgFp1 + 0.00168 × vd3p1 = 0.042
(2-7)vd3p1 = 44.46
(2-8)f3c1/f3c2 = −0.89
(2-9)f3c1/f3c3 = 0.37
(2-10)vd3p − vd3n = −2.13
(2-11)nd3n − nd3p = 0.20
(2-12)vd2p = 33.72

Thus, the optical system OL4 satisfies the above conditional expressions (1-1) to (1-7), (2-1) to (2-12).

Figure 8:
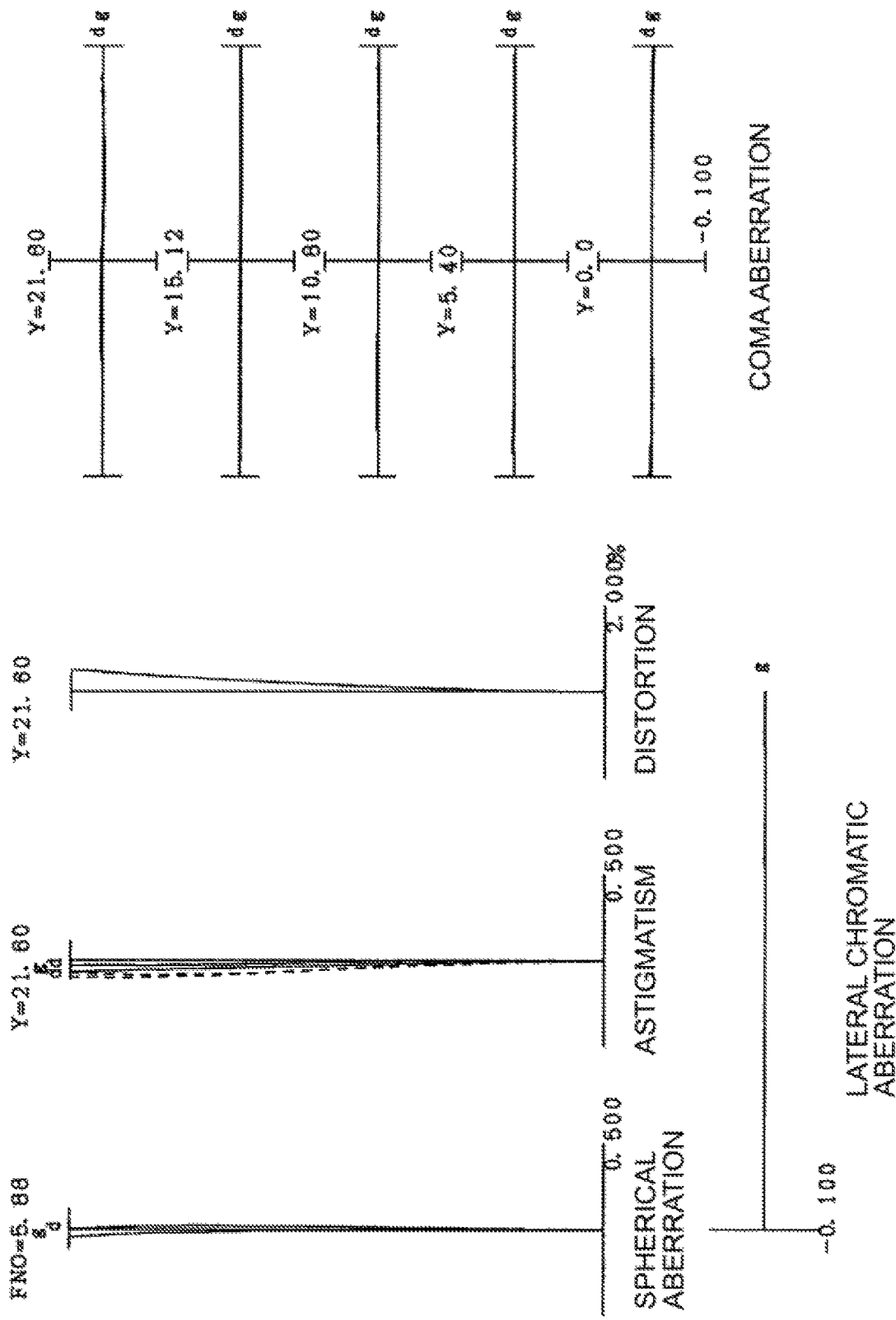
FIG. 8 illustrates graphs showing various aberrations of the optical system according to Example 4 in an infinity focusing state.

A spherical aberration graph, an astigmatism graph, a distortion graph, a lateral chromatic aberration graph and a coma aberration graph in an infinite focusing state of the optical system OL4 are shown in FIG. 8. It is clear from these aberration graphs that various aberrations have been successfully corrected from an infinity focusing state to a short distance focusing state in this optical system OL4.

Example 5

Figure 9:
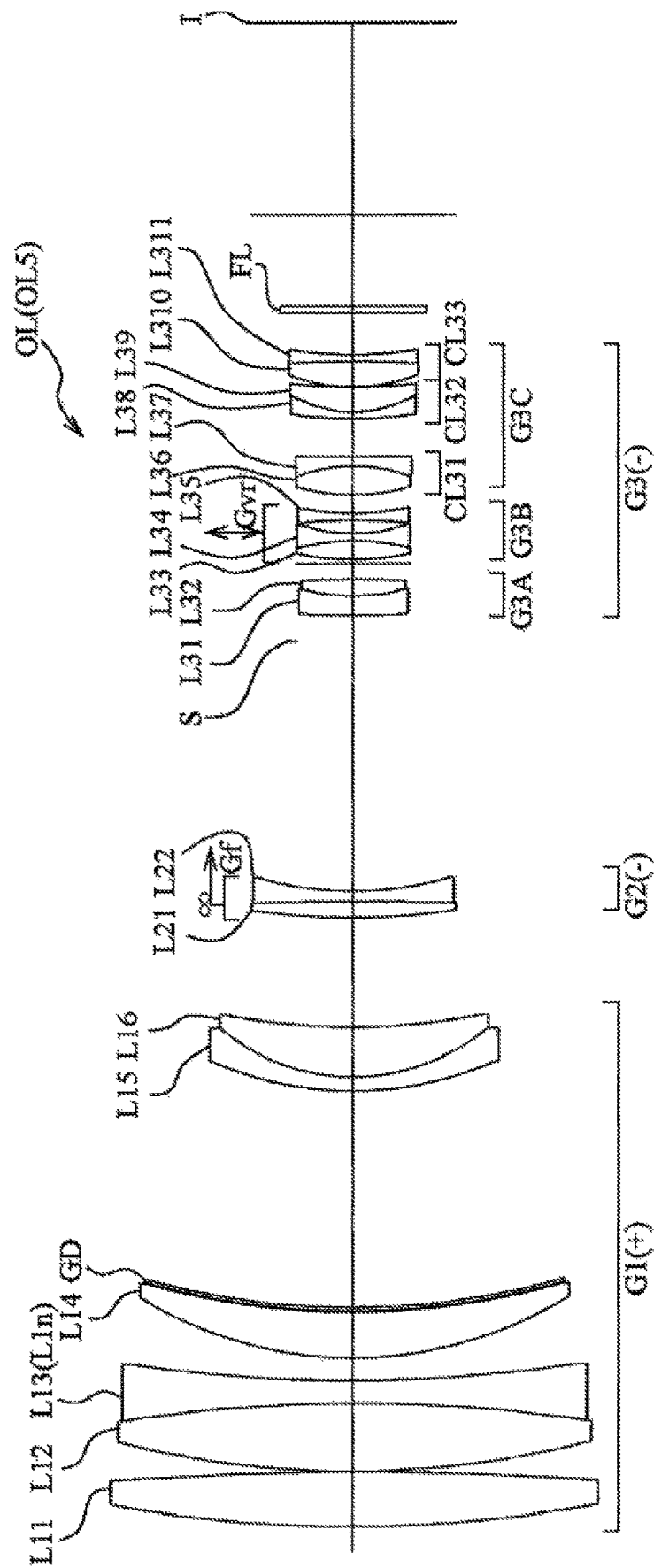
FIG. 9 is a cross-sectional view illustrating a lens configuration of an optical system according to Example 5 in an infinity focusing state.

FIG. 9 is a diagram illustrating a configuration of an optical system OL5 according to Example 5. This optical system OL5 is provided with, in order from an object, a first lens group G1 having positive refractive power, a second lens group G2 having negative refractive power, an aperture stop S and a third lens group G3 having negative refractive power, the second lens group G2 being used as a focusing lens group Gf which is moved along the optical axis to perform focusing.

The first lens group G1 is constructed of, in order from the object, a biconvex positive lens L11, a cemented positive lens resulting from cementing a biconvex positive lens L12 and a biconcave negative lens L13, a positive meniscus lens L14 having a concave surface facing the image, in which a close-contact multi layer type diffractive optical element GD using two different types of materials is formed and a cemented negative lens resulting from cementing a negative meniscus lens L15 having a convex surface facing the object and a positive meniscus lens L16 having a convex surface facing the object. The second lens group G2 is constructed of a cemented negative lens resulting from cementing a biconvex positive lens L21 and a biconcave negative lens L22, in order from the object. The third lens group G3 is constructed of, in order from the object, a cemented negative lens resulting from cementing a negative meniscus lens L31 having a convex surface facing the object and a biconvex positive lens L32, a cemented negative lens resulting from cementing a biconvex positive lens L33 and a biconcave negative lens L34, a biconcave negative lens L35, a cemented positive lens CL31 resulting from cementing a biconvex positive lens L36 and a biconcave negative lens L37, a cemented negative lens CL32 resulting from cementing a negative meniscus lens L38 having a convex surface facing the object and a positive meniscus lens L39 having a convex surface facing the object and a cemented positive lens CL33 resulting from cementing a biconvex positive lens L310 and a biconcave negative lens L311.

In the optical system OL5 according to Example 5, the cemented negative lens resulting from cementing the biconvex positive lens L33 and the biconcave negative lens L34, and the biconcave negative lens L35 in the third lens group G3 are used as a vibration-isolating group Gvr. The optical system OL5 is configured to correct a change in the image position caused by vibration or the like of the optical system OL5 by moving the vibration-isolating group Gvr so as to have a displacement component in a direction orthogonal to an optical axis.

Table 17 below shows data values of the optical system OL5.

TABLE 17

Example 5
[General data]
f = 587.82207
FNo = 5.88304
ω = 2.51193
TL = 334.33637
[Lens data]

| m | r | d | vd | nd | θgF |
|---|---|---|---|---|---|
| Object surface | ∞ | | | | |
| 1 | 302.4929 | 12.0000 | 70.32 | 1.487490 | 0.5291 |
| 2 | −715.9215 | 0.1000 | | | |
| 3 | 210.7157 | 15.0000 | 70.32 | 1.487490 | 0.5291 |
| 4 | −342.1326 | 5.0000 | 44.46 | 1.612660 | 0.564 |
| 5 | 333.1726 | 5.0000 | | | |
| 6 | 90.8030 | 10.0000 | 63.88 | 1.516800 | 0.536 |
| 7 | 171.8616 | 0.4000 | 33.36 | 1.527800 | 0.6291 |
| 8* | 171.8616 | 0.6000 | 49.98 | 1.557147 | 0.5688 |
| 9 | 171.8616 | 47.3894 | | | |
| 10 | 80.6830 | 3.0000 | 40.66 | 1.883000 | 0.5668 |

TABLE 17-continued

Example 5
[General data]
f = 587.82207
FNo = 5.88304
ω = 2.51193
TL = 334.33637
[Lens data]

| 11 | 45.9758 | 11.0000 | 70.32 | 1.487490 | 0.5291 |
|---|---|---|---|---|---|
| 12 | 158.1668 | D1 | | | |
| 13 | 163.1229 | 3.5000 | 33.72 | 1.647690 | 0.593 |
| 14 | −678.8737 | 2.2000 | 50.27 | 1.719990 | 0.5527 |
| 15 | 75.9479 | D2 | | | |
| 16 | 0.0000 | 5.6200 | | | S |
| 17 | 227.5523 | 4.2000 | 46.59 | 1.816000 | 0.5567 |
| 18 | 43.5080 | 3.6503 | 58.82 | 1.518230 | 0.5449 |
| 19 | −176.3202 | 3.5000 | | | |
| 20 | 0.0000 | 0.9168 | | | |
| 21 | 62.2833 | 4.0000 | 36.40 | 1.620040 | 0.5878 |
| 22 | −55.1599 | 1.7000 | 67.90 | 1.593190 | 0.544 |
| 23 | 38.1756 | 2.6955 | | | |
| 24 | −129.4541 | 1.6000 | 67.90 | 1.593190 | 0.544 |
| 25 | 62.2355 | 4.0000 | | | |
| 26 | 47.1782 | 6.3136 | 40.98 | 1.581440 | 0.5763 |
| 27 | −35.5372 | 2.0000 | 67.90 | 1.593190 | 0.544 |
| 28 | 939.6807 | 8.3679 | | | |
| 29 | 99.9008 | 1.5000 | 40.66 | 1.883000 | 0.5668 |
| 30 | 28.0287 | 5.3178 | 44.46 | 1.612660 | 0.564 |
| 31 | 118.6519 | 0.1000 | | | |
| 32 | 39.8576 | 5.5971 | 36.40 | 1.620040 | 0.5878 |
| 33 | −253.7914 | 1.5000 | 20.88 | 1.922860 | 0.639 |
| 34 | 92.8638 | 9.0000 | | | |
| 35 | 0.0000 | 1.5000 | 63.88 | 1.516800 | 0.536 |
| 36 | 0.0000 | 20.0000 | | | |
| 37 | 0.0000 | BF | | | |
| Image surface | ∞ | | | | |

[Lens group focal length]

| Lens group | Starting surface | Focal length |
|---|---|---|
| First lens group | 1 | 195.3 |
| Second lens group | 13 | −182.2 |
| Third lens group | 16 | −121.3 |

In the optical system OL5, the 8th surface is a diffractive optical surface. Table 18 below shows diffractive optical surface data.

TABLE 18

[Diffractive optical surface data]

| m | λ0 | n | C2 | C4 |
|---|---|---|---|---|
| 8 | 587.6 | 1.0 | −3.15496E−05 | 1.94872E−10 |

In the optical system OL5, an axial air distance D1 between the first lens group G1 and the second lens group G2, an axial air distance D2 between the second lens group G2 and the third lens group G3 and a back focus BF vary upon focusing. Table 19 below shows variable distances in an infinity focusing state, an intermediate distance focusing state and a short distance focusing state.

TABLE 19

[Variable distance data]

| Focusing state | Infinite distance | Intermediate distance | Short distance |
|---|---|---|---|
| f | 587.82207 | — | — |
| β | — | −0.03333 | −0.17715 |

TABLE 19-continued

[Variable distance data]

| Focusing state | Infinite distance | Intermediate distance | Short distance |
|---|---|---|---|
| D0 | ∞ | 17647.0010 | 3314.9820 |
| D1 | 23.85485 | 27.17253 | 42.96010 |
| D2 | 54.71307 | 51.39539 | 35.60782 |
| BF | 42.00000 | 41.99968 | 41.99993 |

Table 20 below shows each conditional expression corresponding value in the optical system OL5.

TABLE 20 fpf = 15848.1
[Conditional expression corresponding value]

(1-1) f/fpf = 0.037
(1-2) nd1 + 0.006 × vd1n = 1.879
(1-3) vd1n = 44.5
(1-4) TL/f = 0.569
(1-5) θgF1n + 0.00168 × vd1n = 0.639
(1-6) f1/f = 0.332
(1-7) f1/fpf = 0.012
(2-1) θgF3n + 0.00168 × vd3n = 0.658, 0.674
(2-2) nd3n + 0.01 × vd3n = 2.272, 2.132
(2-3) TL/f = 0.57
(2-4) vd3n1 = 67.90
(2-5) vd3n2 = 20.88
(2-6) θgFp1 + 0.00168 × vd3p1 = 0.042
(2-7) vd3p1 = 44.46
(2-8) f3c1/f3c2 = −0.52
(2-9) f3c1/f3c3 = 0.45
(2-10) vd3p − vd3n = 3.80
(2-11) nd3n − nd3p = 0.27
(2-12) vd2p = 33.72

Thus, the optical system OL5 satisfies the above conditional expressions (1-1) to (1-7), (2-1) to (2-3), (2-5) to (2-12).

Figure 10:
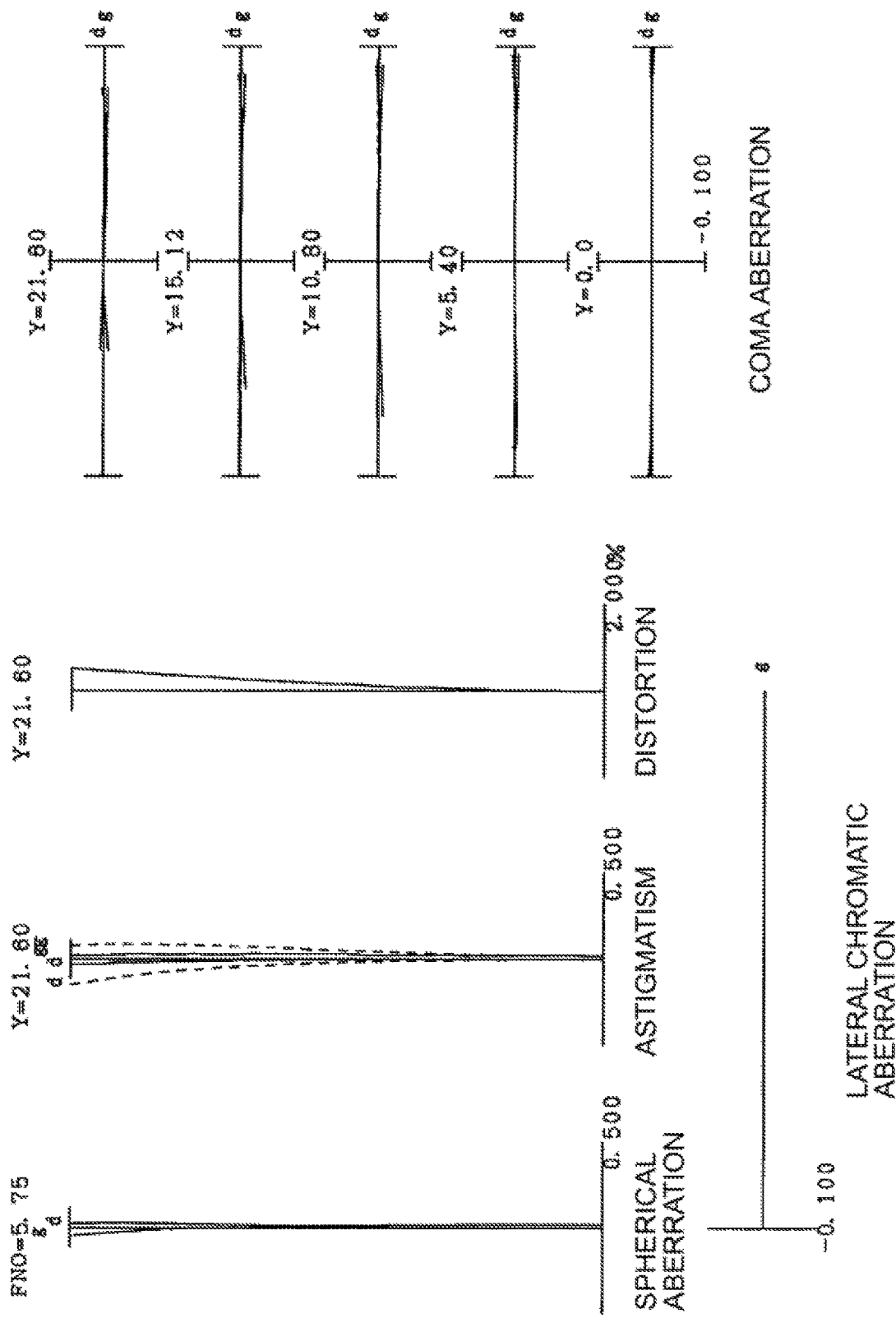
FIG. 10 illustrates graphs showing various aberrations of the optical system according to Example 5 in an infinity focusing state.

A spherical aberration graph, an astigmatism graph, a distortion graph, a lateral chromatic aberration graph and a coma aberration graph in an infinite focusing state of the optical system OL5 are shown in FIG. 10. It is clear from these aberration graphs that various aberrations have been successfully corrected from an infinity focusing state to a short distance focusing state in this optical system OL5.

EXPLANATION OF NUMERALS AND CHARACTERS

| 1 | Camera (optical apparatus) |
|---|---|
| OL (OL1 to OL5) | Optical system |
| G1 | First lens group |
| G2 | Second lens group (Gf focusing group) |
| G3 | Third lens group |
| GD | Diffractive optical element |
| L1n | Negative lens element |
| Gvr | Vibration-isolating group |

The invention claimed is:

1. An optical system comprising:
a focusing group that moves upon focusing;
a diffractive optical element disposed on an object side of the focusing group; and
a negative lens element disposed on the object side of the diffractive optical element, wherein
the following expressions are satisfied:

$$0.030<f/fpf<0.050$$

$$nd1n+0.006\times vd1n<1.890$$

$$35<vd1n$$

where,
f: focal length of whole system in infinity focusing state
fpf: focal length of the diffractive optical element
nd1n: refractive index of medium of the negative lens element on d-line
vd1n: Abbe number of medium of the negative lens element on d-line
where, the lens element refers to each lens constituting a single lens or cemented lens.

2. The optical system according to claim 1, wherein the following expression is satisfied:

$$TL/f<0.61$$

where,
TL: total length in infinity focusing state
f: focal length of whole system in infinity focusing state.

3. The optical system according to claim 1, comprising:
a first lens group having positive refractive power;
a second lens group which is the focusing group and has negative refractive power;
a third lens group, which are disposed in order from an object.

4. The optical system according to claim 3, wherein the first lens group comprises two positive lens elements and the negative lens element on the object side of the diffractive optical element.

5. The optical system according to claim 3, wherein the following expression is satisfied:

$$0.200<f1/f<0.500$$

where,
f1: focal length of the first lens group
f: focal length of whole system.

6. An optical system comprising:
a focusing group that moves upon focusing and has at least two lens elements;
a diffractive optical element disposed on an object side of the focusing group;
a vibration-isolating group disposed on an image side of the focusing group and configured to move so as to have a displacement component in a direction orthogonal to an optical axis; and
at least three negative lens elements disposed on the image side of the vibration-isolating group,
at least two of the three negative lens elements are specific negative lens elements that satisfy the following expressions:

$$0.654<\theta gF3n+0.00168\times vd3n$$

$$1.98<nd3n+0.01\times vd3n$$

where,
θgF3n: partial dispersion ratio of medium of the specific negative lens element
vd3n: Abbe number of medium of the specific negative lens element on d-line
nd3n: refractive index of medium of the specific negative lens element on d-line,
the optical system further satisfying the following expression:

$$TL/f<0.61$$

where,

TL: total length in infinity focusing state
f: focal length of whole system in infinity focusing state
where, the lens element refers to each lens constituting a single lens or cemented lens.

7. The optical system according to claim 6, wherein at least one of the specific negative lens elements satisfies the following expression:

$$70<vd3n1$$

where,
vd3n1: Abbe number of medium of the specific negative lens element on d-line.

8. The optical system according to claim 6, wherein at least one of the specific negative lens elements satisfies the following expression:

$$vd3n2<34$$

where,
vd3n2: Abbe number of medium of the specific negative lens element on d-line.

9. The optical system according to claim 6, comprising at least one of specific positive lens elements on the image side of the vibration-isolating group that satisfies the following expressions:

$$\theta gF3p+0.00168\times vd3p1<0.664$$

$$vd3p1<70$$

where,
θgF3p: partial dispersion ratio of medium of the specific positive lens element
vd3p1: Abbe number of medium of the specific positive lens element on d-line.

10. The optical system according to claim 6, further comprising a first cemented lens, a second cemented lens and a third cemented lens on the image side of the vibration-isolating group, which are disposed in order from the object, wherein
the following expressions are satisfied:

$$-1.20<f3c1/f3c2<-0.80$$

$$0.30<f3c1/f3c3<0.50$$

where,
f3c1: focal length of the first cemented lens
f3c2: focal length of the second cemented lens
f3c3: focal length of the third cemented lens.

11. The optical system according to claim 10, wherein at least one of the cemented lenses disposed on the image side of the vibration-isolating group satisfies the following expressions:

$$vd3p-vd3n<10$$

$$0.10<nd3n-nd3p$$

where,
vd3p: Abbe number of medium of positive lens element constituting the cemented lens on d-line
vd3n: Abbe number of medium of negative lens elements constituting the cemented lens on d-line
nd3p: refractive index of medium of positive lens elements constituting the cemented lens on d-line
nd3n: refractive index of medium of negative lens elements constituting the cemented lens on d-line.

12. The optical system according to claim 6, comprising:
a first lens group having positive refractive power;
a second lens group which is the focusing group and has negative refractive power; and
a third lens group, which are disposed in order from the object.

13. The optical system according to claim 12, wherein the second lens group which is the focusing group comprises a positive lens element that satisfies the following expression:

$$vd2p<50$$

where,
vd2p: Abbe number of medium of the positive lens element included in the second lens group on d-line.

14. An optical apparatus comprising the optical system according to claim 1.

15. An optical apparatus comprising the optical system according to claim 6.

16. An optical system comprising:
a focusing group that moves upon focusing;
a diffractive optical element disposed on an object side of the focusing group; and
a negative lens element disposed on the object side of the diffractive optical element, wherein
all lenses disposed on the object side of the diffractive optical element are positive lens elements except the negative lens element, and
the following expressions are satisfied:

$$0.030<f/fpf<0.050$$

$$nd1n+0.006\times vd1n<1.910$$

$$35<vd1n$$

where,
f: focal length of whole system in infinity focusing state
fpf: focal length of the diffractive optical element
nd1n: refractive index of medium of the negative lens element on d-line
vd1n: Abbe number of medium of the negative lens element on d-line
where, the lens element refers to each lens constituting a single lens or cemented lens.

17. An optical system comprising:
a focusing group that moves upon focusing;
a diffractive optical element disposed on an object side of the focusing group; and
a negative lens element disposed on the object side of the diffractive optical element, wherein
the following expressions are satisfied:

$$0.030<f/fpf<0.050$$

$$nd1n+0.006\times vd1n<1.910$$

$$35<vd1n$$

$$\theta gF1n+0.00168\times vd1n<0.643$$

where,
f: focal length of whole system in infinity focusing state
fpf: focal length of the diffractive optical element
nd1n: refractive index of medium of the negative lens element on d-line
vd1n: Abbe number of medium of the negative lens element on d-line
θgF1n: partial dispersion ratio of medium of the negative lens element
where, the lens element refers to each lens constituting a single lens or cemented lens.

18. An optical system comprising:
a focusing group that moves upon focusing;

a diffractive optical element disposed on an object side of the focusing group; and
a negative lens element disposed on the object side of the diffractive optical element, wherein
the optical system comprises a first lens group having positive refractive power, a second lens group which is the focusing group, and a third lens group, which are disposed in order from an object,
the first lens group comprises one positive lens element and one negative lens element, which are disposed on the image side of the diffractive optical element, and
the following expressions are satisfied:

$0.030 < f/fpf < 0.050$ $nd1n + 0.006 \times vd1n < 1.910$ $35 < vd1n$ where,
f: focal length of whole system in infinity focusing state
fpf: focal length of the diffractive optical element
nd1n: refractive index of medium of the negative lens element on d-line
vd1n: Abbe number of medium of the negative lens element on d-line
where, the lens element refers to each lens constituting a single lens or cemented lens.

19. An optical system comprising:
a focusing group that moves upon focusing;
a diffractive optical element disposed on an object side of the focusing group; and
a negative lens element disposed on the object side of the diffractive optical element, wherein
the optical system comprises a first lens group having positive refractive power, a second lens group which is the focusing group, and a third lens group, which are disposed in order from an object, and
the following expressions are satisfied:

$0.030 < f/fpf < 0.050$ $nd1n + 0.006 \times vd1n < 1.910$ $35 < vd1n$ $0.001 < f1/fpf < 0.030$ where,
f: focal length of whole system in infinity focusing state
f1: focal length of the first lens group
fpf: focal length of the diffractive optical element
nd1n: refractive index of medium of the negative lens element on d-line
vd1n: Abbe number of medium of the negative lens element on d-line
where, the lens element refers to each lens constituting a single lens or cemented lens.

20. A method for manufacturing an optical system comprising a focusing group that moves upon focusing, and a diffractive optical element disposed on an object side of the focusing group,
the method comprising one of the following features A, B, C, D, E and F, wherein
the feature A comprising:
disposing a negative lens element on the object side of the diffractive optical element; and
disposing the lens groups and lens elements in a lens barrel so as to satisfy the following expressions:

$0.030 < f/fpf < 0.050$ $nd1n + 0.006 \times vd1n < 1.890$ $35 < vd1n$ where,
f: focal length of whole system in infinity focusing state
fpf: focal length of the diffractive optical element
nd1n: refractive index of medium of the negative lens element on d-line
vd1n: Abbe number of medium of the negative lens element on d-line
where, the lens element refers to each lens constituting a single lens or cemented lens,
the feature B comprising:
disposing the focusing group having at least two lens elements;
disposing a vibration-isolating group on an image side of the focusing group and configured to move so as to have a displacement component in a direction orthogonal to an optical axis;
disposing at least three negative lens elements on the image side of the vibration-isolating group; and
disposing the lens groups and lens elements in a lens barrel so that at least two of the three negative lens elements being specific negative lens elements that satisfy the following expressions:

$0.654 < \theta gF3n + 0.00168 \times vd3n$ $1.98 < nd3n + 0.01 \times vd3n$ where,
θgF3n: partial dispersion ratio of medium of the specific negative lens element
vd3n: Abbe number of medium of the specific negative lens element on d-line
nd3n: refractive index of medium of the specific negative lens element on d-line; and
the method further comprising disposing the lens groups and lens elements so as to satisfy the following expression:

$TL/f < 0.61$ where,
TL: total length in infinity focusing state
f: focal length of whole system in infinity focusing state
where, the lens element refers to each lens constituting a single lens or cemented lens,
the feature C comprising:
disposing a negative lens element on the object side of the diffractive optical element;
arranging all lenses disposed on the object side of the diffractive optical element so as to be consisted of positive lens elements except the negative lens element; and
disposing the lens groups and lens elements in a lens barrel so as to satisfy the following expressions:

$0.030 < f/fpf < 0.050$ $nd1n + 0.006 \times vd1n < 1.910$ $35 < vd1n$ where,
f: focal length of whole system in infinity focusing state
fpf: focal length of the diffractive optical element
nd1n: refractive index of medium of the negative lens element on d-line
vd1n: Abbe number of medium of the negative lens element on d-line where, the lens element refers to each lens constituting a single lens or cemented lens, the feature D comprising:

disposing a negative lens element on the object side of the diffractive optical element; and disposing the lens groups and lens elements in a lens barrel so as to satisfy the following expressions:

$0.030 < f/fpf < 0.050$ $nd1n + 0.006 \times vd1n < 1.910$ $35 < vd1n$ $\theta gF1n + 0.00168 \times vd1n < 0.643$ where,
- f: focal length of whole system in infinity focusing state
- fpf: focal length of the diffractive optical element
- nd1n: refractive index of medium of the negative lens element on d-line
- vd1n: Abbe number of medium of the negative lens element on d-line
- θgF1n: partial dispersion ratio of medium of the negative lens element
- vd1n: Abbe number of medium of the negative lens element on d-line where, the lens element refers to each lens constituting a single lens or cemented lens, the feature E comprising:

disposing a negative lens element on the object side of the diffractive optical element;

disposing a first lens group having positive refractive power, a second lens group which is the focusing group, and a third lens group, in order from an object;

disposing the first lens group comprising one positive lens element and one negative lens element on the image side of the diffractive optical element; and disposing the lens groups and lens elements in a lens barrel so as to satisfy the following expressions:

$0.030 < f/fpf < 0.050$ $nd1n + 0.006 \times vd1n < 1.910$ $35 < vd1n$ where,
- f: focal length of whole system in infinity focusing state
- fpf: focal length of the diffractive optical element
- nd1n: refractive index of medium of the negative lens element on d-line
- vd1n: Abbe number of medium of the negative lens element on d-line where, the lens element refers to each lens constituting a single lens or cemented lens, the feature F comprising:

disposing a negative lens element on the object side of the diffractive optical element;

disposing the optical system comprising a first lens group having positive refractive power, a second lens group which is the focusing group, and a third lens group, in order from an object; and disposing the lens groups and lens elements in a lens barrel so as to satisfy the following expressions:

$0.030 < f/fpf < 0.050$ $nd1n + 0.006 \times vd1n < 1.910$ $35 < vd1n$ $0.001 < f1/fpf < 0.030$ where,
- f: focal length of whole system in infinity focusing state
- f1: focal length of the first lens group
- fpf: focal length of the diffractive optical element
- nd1n: refractive index of medium of the negative lens element on d-line
- vd1n: Abbe number of medium of the negative lens element on d-line where, the lens element refers to each lens constituting a single lens or cemented lens.

* * * * *